United States Patent
Jin et al.

(10) Patent No.: US 9,485,224 B2
(45) Date of Patent: Nov. 1, 2016

(54) INFORMATION DELIVERY SYSTEM WITH ADVERTISING MECHANISM AND METHOD OF OPERATION THEREOF

(71) Applicant: Samsung Electronics Co., Ltd., Gyeonggi-Do (KR)

(72) Inventors: Hongxia Jin, San Jose, CA (US); Alan Messer, Los Gatos, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 93 days.

(21) Appl. No.: 14/021,132

(22) Filed: Sep. 9, 2013

(65) Prior Publication Data

US 2014/0281532 A1  Sep. 18, 2014

Related U.S. Application Data

(60) Provisional application No. 61/785,188, filed on Mar. 14, 2013.

(51) Int. Cl.
| | |
|---|---|
| *H04L 9/32* | (2006.01) |
| *G06F 21/00* | (2013.01) |
| *G06F 7/04* | (2006.01) |
| *H04L 29/06* | (2006.01) |
| *G06F 21/31* | (2013.01) |

(52) U.S. Cl.
CPC ....... *H04L 63/0428* (2013.01); *H04L 63/0407* (2013.01); *G06F 21/31* (2013.01); *H04L 63/08* (2013.01)

(58) Field of Classification Search
CPC .... H04L 63/08; H04L 63/0428; G06F 21/31
USPC ...................... 713/168, 182; 726/5
See application file for complete search history.

(56) References Cited

U.S. PATENT DOCUMENTS

| | | | |
|---|---|---|---|
| 2002/0184530 A1* | 12/2002 | Spector ......................... | 713/201 |
| 2004/0030887 A1 | 2/2004 | Harrisville-Wolff et al. | |
| 2010/0042833 A1* | 2/2010 | Platt ..................... | G06F 21/6254 713/168 |
| 2010/0223349 A1* | 9/2010 | Thorson ............... | G06Q 10/107 709/206 |
| 2010/0312706 A1 | 12/2010 | Combet et al. | |
| 2010/0313009 A1* | 12/2010 | Combet ............. | G06Q 30/0204 713/150 |
| 2010/0319059 A1* | 12/2010 | Agarwal ................. | H04L 9/321 726/7 |
| 2011/0208427 A1* | 8/2011 | Jansen et al. ................. | 701/208 |

(Continued)

FOREIGN PATENT DOCUMENTS

| | | |
|---|---|---|
| KR | 1020090063635 A | 6/2009 |
| KR | 1020100114321 A | 10/2010 |

OTHER PUBLICATIONS

Narayanan et al., Location Privacy via Private Proximity Testing, pp. 1-17, Stanford University.

(Continued)

*Primary Examiner* — Aravind Moorthy
(74) *Attorney, Agent, or Firm* — IP Investment Law Group

(57) ABSTRACT

An information delivery system includes: a control unit configured to: generate an anonymous identity for concealing client information of an anonymous client from a provider, generate a comparison result for determining whether a client encryption data of the anonymous identity matches with a provider encryption data of the provider, obtain a provider notification based on the comparison result of a match for displaying on a device, and a user interface, coupled to the control unit, configured to display the provider notification.

31 Claims, 8 Drawing Sheets

(56) References Cited

U.S. PATENT DOCUMENTS

| | | | |
|---|---|---|---|
| 2013/0275695 A1* | 10/2013 | Ponsford et al. | 711/162 |
| 2014/0095966 A1* | 4/2014 | Burkard | G06F 17/30902 715/205 |
| 2014/0372752 A1* | 12/2014 | Sallis | G06F 21/32 713/165 |
| 2015/0020126 A1* | 1/2015 | Kegel et al. | 725/87 |

OTHER PUBLICATIONS

Toubiana, et al., Adnostic: Privacy Preserving Targeted Advertising, pp. 1-23.

* cited by examiner

INFORMATION DELIVERY SYSTEM WITH ADVERTISING MECHANISM AND METHOD OF OPERATION THEREOF

CROSS-REFERENCE

This application claims the benefit of U.S. Provisional Patent Application Ser. No. 61/785,188 filed Mar. 14, 2013, and the subject matter thereof is incorporated herein by reference thereto.

TECHNICAL FIELD

An embodiment of the present invention relates generally to an information delivery system, and more particularly to a system for advertising mechanism.

BACKGROUND

Modern portable client and industrial electronics, especially client devices such as navigation systems, cellular phones, portable digital assistants, and combination devices are providing increasing levels of functionality to support modem life including location-based information services. Research and development in the existing technologies can take a myriad of different directions.

As users become more empowered with the growth of devices, new and old paradigms begin to take advantage of this new device space. There are many technological solutions to take advantage of this new device location opportunity. One existing approach is to use location information to provide personalized content through a mobile device, such as a cell phone, smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Thus, a need still remains for an information delivery system with advertising mechanism for aiding the consumption of information while addressing privacy concerns. The existing systems achieve personalization by collecting a large amount of data that breaks privacy. In view of the ever-increasing commercial competitive pressures, along with growing client expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an information delivery system including: a control unit configured to: generate an anonymous identity for concealing client information of an anonymous client from a provider, generate a comparison result for determining whether a client encryption data of the anonymous identity matches with a provider encryption data of the provider; obtain a provider notification based on the comparison result of a match for displaying on a device, and a user interface, coupled to the control unit, configured to display the provider notification.

An embodiment of the present invention provides an information delivery system including: a control unit configured to: provide a provider testable representation for revealing a provider identity, generate a provider encryption data based on encrypting the provider testable representation with a provider key; and a communication unit, coupled to the control unit, configured to send a provider identity based on a comparison proceeding for the provider encryption data.

An embodiment of the present invention provides a method of operation of an information delivery system including: generating an anonymous identity with a control unit for concealing client information of an anonymous client from a provider; generating a comparison result for determining whether a client encryption data of the anonymous identity matches with a provider encryption data of the provider; and obtaining a provider notification based on the comparison result of a match for displaying on a device.

An embodiment of the present invention provides a non-transitory computer readable medium including: generating an anonymous identity for concealing client information of an anonymous client from a provider; generating a comparison result for determining whether a client encryption data of the anonymous identity matches with a provider encryption data of the provider; and obtaining a provider notification based on the comparison result of a match for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
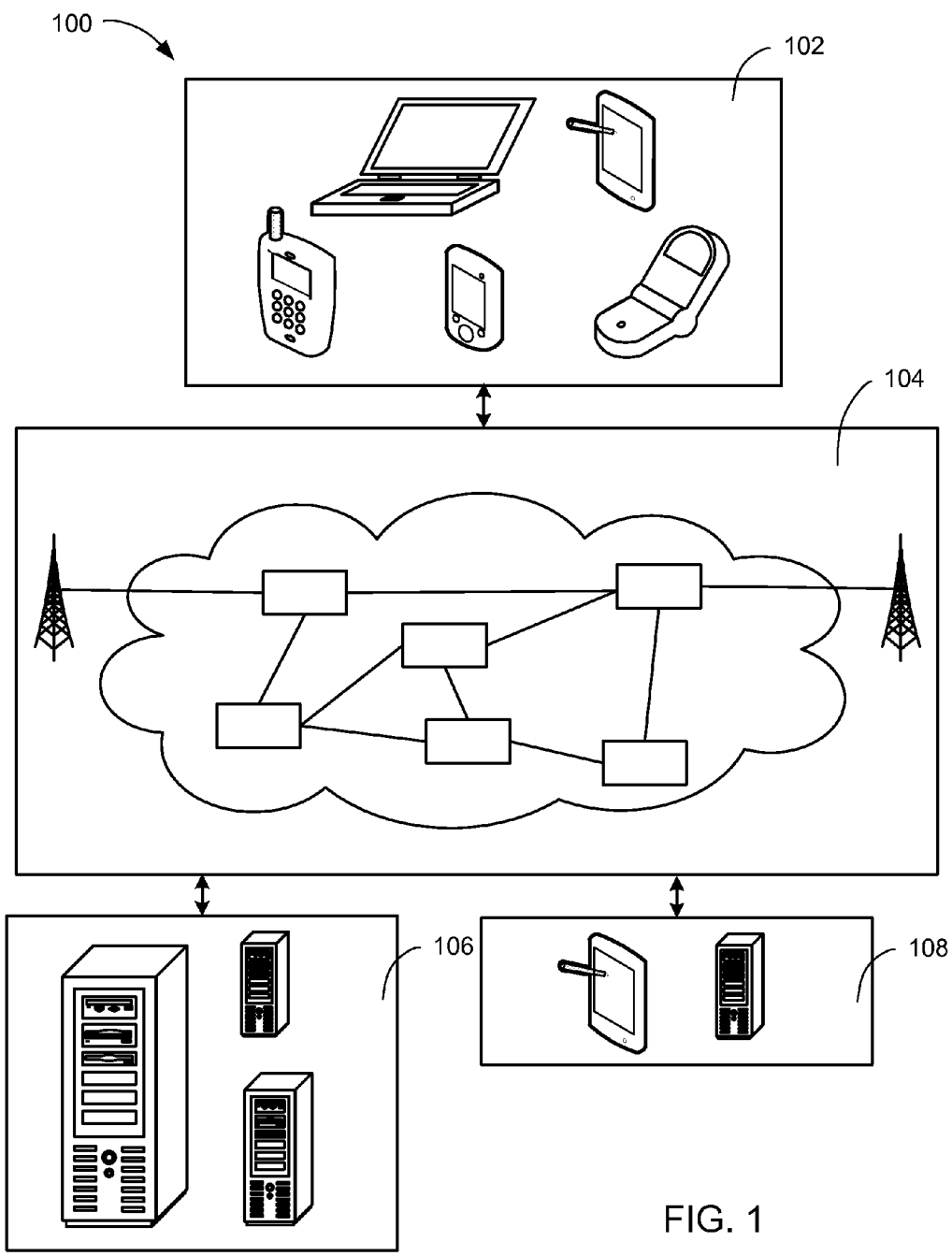
FIG. 1 is an information delivery system with advertising mechanism in an embodiment of the present invention.

The following embodiments of the present invention provides an asymmetric privacy equivalency testing to allow a client to privately determine if a provider offers a provider notification desired by the client without the provider knowing the client is desiring a product, service, or a combination thereof. The client can determine whether to send a fetch request based on a comparison result of comparing a client testable representation and provider testable representation. As a result, the client can obtain the provider notification relevant to the client without revealing client information to the provider.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an information delivery system 100 with advertising mechanism in an embodiment of the present invention. The information delivery system 100 includes a first device 102, such as a client or a server, connected to a second device 106, such as a client or server. The first device 102 can communicate with the second device 106 with a communication path 104, such as a wireless or wired network. The information delivery system 100 can also include a third device 108 connected to the first device 102, the second device 106, or a combination thereof with the communication path 104. The third device 108 can be a client or server.

For example, the first device 102 or the third device 108 can be of any of a variety of display devices, such as a cellular phone, personal digital assistant, wearable digital device, tablet, notebook computer, television (TV), automotive telematic communication system, or other multi-functional mobile communication or entertainment device. The first device 102 or the third device 108 can be a standalone device, or can be incorporated with a vehicle, for example a car, truck, bus, aircraft, boat/vessel, or train. The first device 102 or the third device 108 can couple to the communication path 104 to communicate with the second device 106.

For illustrative purposes, the information delivery system 100 is described with the first device 102 or the third device 108 as a mobile device, although it is understood that the first device 102 or the third device 108 can be different types of devices. For example, the first device 102 or the third device 108 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102 or the third device 108. The second device 106 can also be a client type device as described for the first device 102 or the third device 108.

In another example, the first device 102, the second device 106, or the third device 108 can be a particularized machine, such as a mainframe, a server, a cluster server, a rack mounted server, or a blade server, or as more specific examples, an IBM System z10™ Business Class mainframe or a HP ProLiant ML™ server. Yet another example, the first device 102, the second device 106, or the third device 108 can be a particularized machine, such as a portable computing device, a thin client, a notebook, a netbook, a smartphone, personal digital assistant, or a cellular phone, and as specific examples, an Apple iPhone™, Android™ smartphone, or Windows™ platform smartphone.

For illustrative purposes, the information delivery system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the information delivery system 100 is shown with the second device 106 and the first device 102 or the third device 108 as end points of the communication path 104, although it is understood that the information delivery system 100 can have a different partition between the first device 102, the second device 106, the third device 108, and the communication path 104. For example, the first device 102, the second device 106, the third device 108 or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
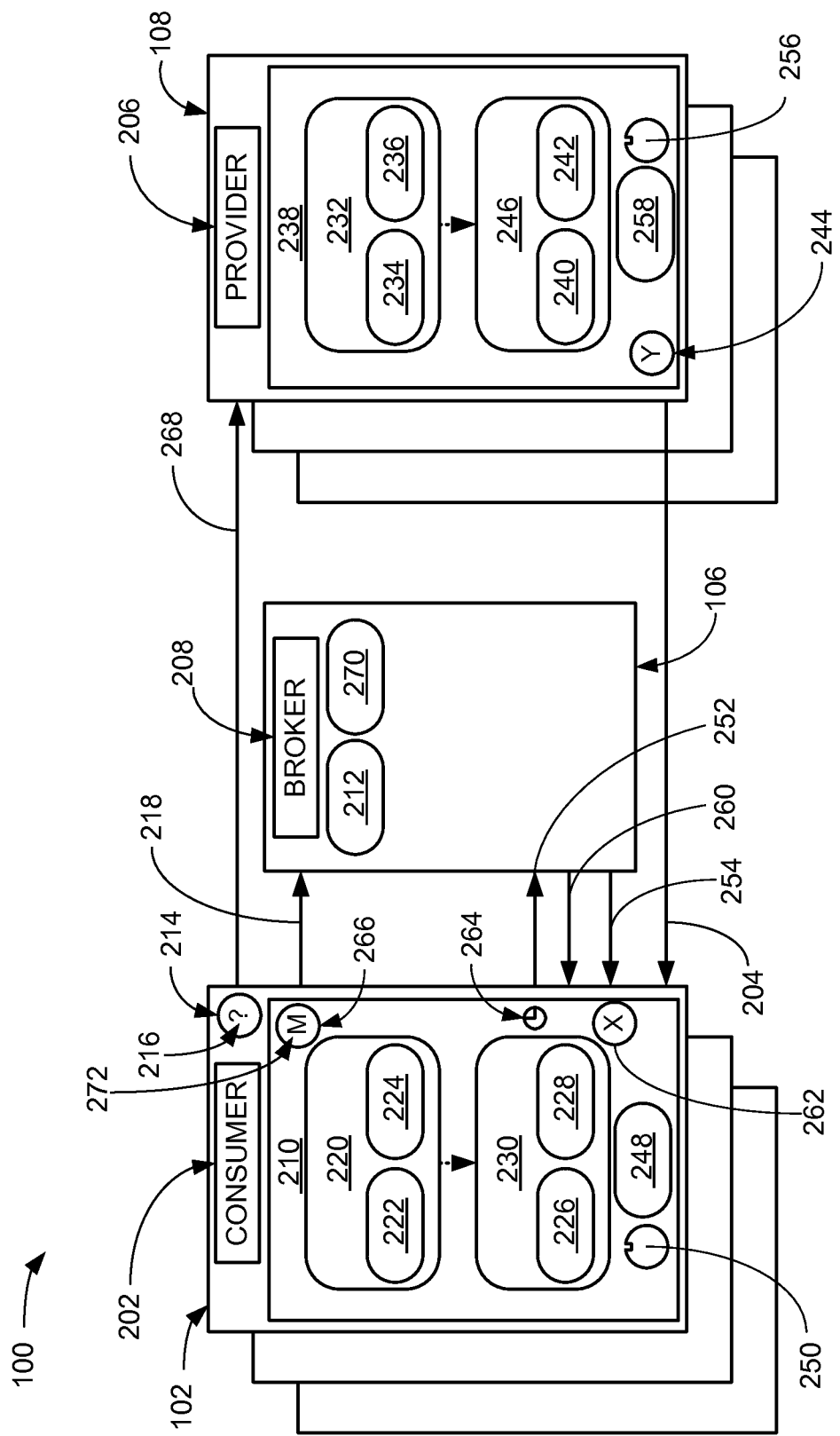
FIG. 2 is an example of an architectural diagram of the information delivery system for an anonymous client requesting a provider notification from a provider.

Referring now to FIG. 2, therein is shown an example of an architectural diagram of the information delivery system 100 for an anonymous client 202 requesting a provider notification 204 from a provider 206. For clarity and brevity, the discussion of the embodiment of the present invention will be described with the anonymous client 202 as the user of the first device 102, the second device 106 as a broker server 208, and the provider 206 as the user of the third device 108. However, the first device 102, the second device 106, and the third device 108 can be discussed interchangeably. For example, the broker server 208 can represent the third device 108 and the provider 206 can use the second device 106 or the first device 102. For further example, the provider 206 can also use the broker server 208.

The anonymous client 202 can be interested in receiving the provider notification 204. The anonymous client 202 is a person, an entity, or a combination thereof interested in receiving the provider notification 204. The provider notification 204 is information related to a product, service, content, information, or a combination thereof provided by the provider 206. For example, the provider notification 204 can represent an advertisement. The provider 206 is a person, an entity, or a combination thereof providing the product, service, or a combination thereof. For example, the provider 206 can represent an advertiser. The provider 206 can represent the user of the third device 108. The broker server 208 can also represent the provider 206.

The broker server 208 can protect the anonymous client 202 from revealing client information 210 to the provider 206. The client information 210 can include a client's current location, a client's activity history, a client's interest for a category of interest 212, a client's profile or a combination thereof. The client's profile can include the name of the anonymous client 202, the address where the anonymous client 202 resides, the age of the anonymous client 202, or a combination thereof.

The category of interest 212 is a classification of a product, a service, or a combination thereof. The category of interest 212 can include "Arts & Entertainment, Computers & Electronics, Internet & Telecom, Law & Government, Science, or a combination thereof.

An anonymous identity 214 is a machine generated identity of the anonymous client 202 to replace the client information 210 when requesting the provider notification 204 from the provider 206. For example, the anonymous identity 214 can conceal the client information 210 from the provider 206, the broker server 208, or a combination thereof. Moreover, the anonymous client 202 can be unknown to the broker server 208, the provider 206, or a combination thereof. The anonymous identity 214 can be generated based on assigning a random identifier 216 to the client information 210. For example, the random identifier 216 can represent a number, an alphabet, an alphanumeric, or a combination thereof.

The anonymous client 202 can make a client selection 218 for the category of interest 212. For example, the client selection 218 can be made for selecting a product, service, or a combination thereof on website serviced by the provider 206, such as Yahoo!™, Amazon™, Google™, or Best Buy™.

The first device 102 can generate client location information 220 having a client location indicator 222, a client location area 224, or a combination thereof. The client location information 220 is an activity record pertaining to a geographic location or area of the anonymous client 202. For example, the client location information 220 can include a historical, current, or a combination thereof of the geographic location or area visited or currently located by the anonymous client 202. The client location indicator 222 is the geographic location of the anonymous client 202. The client location area 224 is the geographic area where the anonymous client 202 is located. Details regarding the client location indicator 222 and the client location area 224 will be discussed below.

A client location abstraction 226 is a substitute representation of the client location information 220. A client interest abstraction 228 is a representation of the client's interest based on the client selection 218 made on a product, a service, or a combination thereof. For example, via the second device 106, the anonymous client 202 can make the client selection 218 on the product, service, or a combination thereof available in the broker server 208. A client testable representation 230 is an aggregation of the client location abstraction 226, the client interest abstraction 228, or a combination thereof to be compared in the private equality test performed by the first device 102, the broker server 208, the third device 108, or a combination thereof. The client information 210 can include the client location information 220, the client location abstraction 226, the client interest abstraction 228, the client testable representation 230, or a combination thereof. Details regarding the private equality test factoring the client testable representation 230 will be discussed below.

The third device 108 can generate provider location information 232 having a provider location indicator 234, a provider location area 236, or a combination thereof. The provider location information 232 is a geographic location or area where the provider 206 is located. The provider location indicator 234 is the geographic location where the provider 206 is located. The provider location area 236 is the geographic area where the provider 206 is located. Details regarding the provider location indicator 234 and the provider location area 236 will be discussed below.

A provider identity 238 can include the provider location indicator 234 of the provider 206, an activity history of the provider 206, a profile of the provider 206, or a combination thereof. The profile can include the name of the provider 206, the address where the provider 206 is located, the service, the product, or a combination thereof offered by the provider 206, or a combination thereof.

A provider location abstraction 240 is a substitute representation of the provider location information 232. A provider promotion abstraction 242 is a representation the product, the service, or a combination thereof that the provider 206 is offering to the anonymous client 202 through the broker server 208. A promotion availability 244 can represent an obtainability of the provider notification 204 by the anonymous client 202 through the broker server 208. For example, the promotion availability 244 can be "yes" if the provider 206 is offering the product, the service, or a combination thereof. In contrast, the promotion availability 244 can be "no" if the provider 206 is not offering the product, the service, or a combination thereof.

A provider testable representation 246 is an aggregation of the provider location abstraction 240, the provider promotion abstraction 242, or a combination thereof to be compared in the private equality test performed by the first device 102, the broker server 208, or a combination thereof. The provider identity 238 can include the provider location information 232, the provider location abstraction 240, the provider promotion abstraction 242, the provider testable representation 246, or a combination thereof. Details regarding the private equality test factoring the provider testable representation 246 will be discussed below.

A client encryption data 248 is an encrypted version of the client testable representation 230. For example, the client testable representation 230 can be encrypted with a client key 250. The client key 250 is information to encrypt the client testable representation 230 into a ciphertext. For example, the client key 250 can be stored on the first device 102. A client first encryption data 252 is the client encryption data 248 encrypted by the client key 250. A client second encryption data 254 is the client encryption data 248 encrypted by a provider key 256.

A provider encryption data 258 is an encrypted version of the provider testable representation 246. For example, the provider testable representation 246 can be encrypted with the provider key 256. The provider key 256 is information to encrypt the provider testable representation 246 into a ciphertext. For example, the provider key 256 can be stored on the second device 106, the third device 108, the broker server 208, or a combination thereof. A provider first encryption data 260 is the provider encryption data 258 encrypted by the provider key 256. A provider second encryption data 262 is the provider encryption data 258 encrypted by the client key 250. The client key 250 and the provider key 256 can be separate keys and a not shared key. More specifically, the client key 250 and the provider key 256 can be different and independent from each other.

A comparison proceeding 264 is a course of action for comparing the client testable representation 230 and the provider testable representation 246. More specifically, the private equality test can include the comparison of the client encryption data 248 and the provider encryption data 258. For example, the comparison proceeding 264 can represent that the private equality test is still not completed, thus, a comparison result 266 is not yet generated. The comparison result 266 is an outcome for comparing the client testable representation 230 and the provider testable representation 246 after the comparison proceeding 264. For example, the comparison result 266 can represent the outcome after performing the private equality test. More specifically, the comparison result 266 can represent the outcome for comparing the client encryption data 248 and the provider encryption data 258.

For a specific example, the comparison result 266 of "success" can represent a match 272 between the client testable representation 230 and the provider testable representation 246. The match 272 is the comparison result 266 of when the client testable representation 230 and the provider testable representation 246 are equivalent or have the same value. More specifically, the match 272 can represent that the provider 206 is offering a product, a service, or a combination thereof interested by the anonymous client 202.

A fetch request 268 is a demand by the anonymous client 202 for the provider 206 to provide the provider notification 204. More specifically, the anonymous client 202 can send the fetch request 268 to the broker server 208, third device 108 to contact the provider 206 directly, or a combination thereof after the comparison result 266 is a "success." If the comparison result 266 is "unsuccessful," the anonymous client 202 can do nothing or not send the fetch request 268.

A customer lead 270 is a conversion of the provider notification 204 sent to the anonymous client 202 in response to the fetch request 268. The operator of the broker server 208 can share the profit with the provider 206 based on the customer lead 270. More specifically, since the client information 210 is unknown to the provider 206 and the broker server 208 can transact with the provider 206 in place of the provider 206, the broker server 208 can track the customer lead 270 generated for the provider 206.

Figure 3:
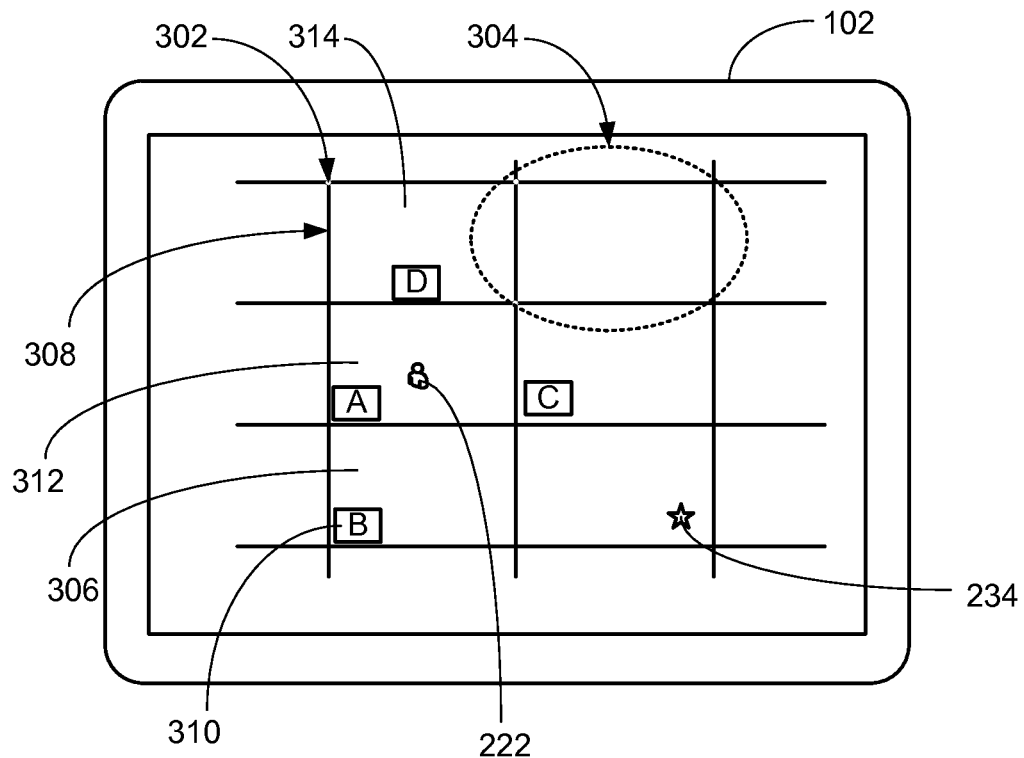
FIG. 3 is an example of the first device displaying the client location information of FIG. 2 and the provider location information of FIG. 2.

Referring now to FIG. 3, therein is shown an example of the first device 102 displaying the client location information 220 of FIG. 2 and the provider location information 232 of FIG. 2. Latitude-longitude information 302 is a geographic coordinate that specifies the north-south and east-west position of a point on the Earth's surface. The client location indicator 222 of FIG. 2 can be identified by the latitude-longitude information 302. A geographic boundary 304 is an outer limit of the client location area 224 of FIG. 2.

A neighboring area 306 is an adjacent instance of one instance of the client location area 224 to another instance of the client location area 224 sharing a borderline 308. A location identifier 310 is a value for representing the client location abstraction 226 of FIG. 2. For example, the location identifier 310 can represent an alphabet, a number, an alphanumeric value, or a combination thereof.

A containing area 312 is the client location area 224 having the client location indicator 222 within the geographic boundary 304. A non-containing area 314 is the client location area 224 without the client location indicator 222 within the geographic boundary 304. For example, the non-containing area 314 can represent the neighboring area 306 to the containing area 312.

The provider location indicator 234 indicating the location of the provider 206 of FIG. 2 can be within the neighboring area 306 representing the non-containing area 314. The non-containing area 314 can represent the provider location area 236 of FIG. 2.

Figure 4:
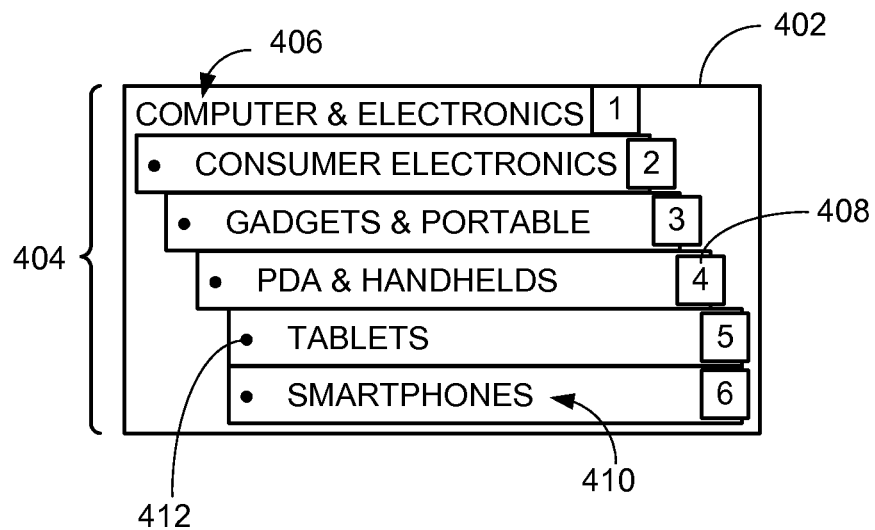
FIG. 4 is an example of a preference hierarchy organized according to a category scheme.

Referring now to FIG. 4, therein is shown an example of a preference hierarchy 402 organized according to a category scheme 404. The category scheme 404 is a hierarchy structure for arranging the category of interest 212 of FIG. 2. A category representation 406 can represent a top item of the category scheme 404 assigned with a category identifier 408. A subcategory representation 410 can represent an item subsequent to the top item of the category scheme 404 assigned with the category identifier 408.

The category identifier 408 is a value to represent the category of interest 212. For example, the category identifier 408 can represent an alphabet, a number, an alphanumeric value, or a combination thereof. The preference hierarchy 402 is a representation of the category representation 406, the subcategory representation 410, or a combination thereof in accordance to the category scheme 404. A hierarchy level 412 is a position within the preference hierarchy 402.

Figure 5:
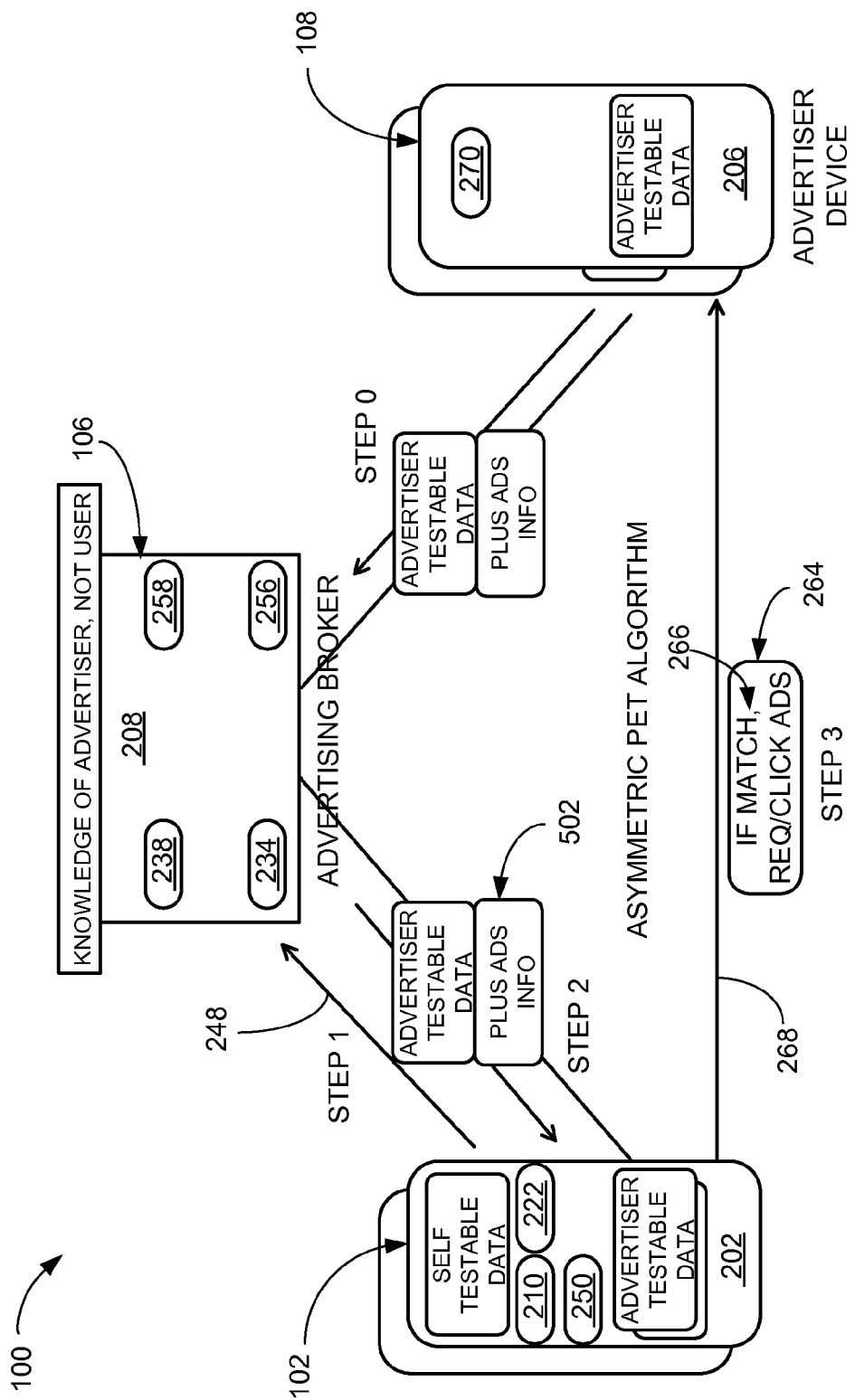
FIG. 5 is an example of a process executed by the information delivery system for managing the anonymous client obtaining the provider notification of FIG. 2 from the provider.

Referring now to FIG. 5, therein is shown an example of a process executed by the information delivery system 100 for managing the anonymous client 202 obtaining the provider notification 204 of FIG. 2 from the provider 206. The anonymous client 202 can use the first device 102. The second device 106 can represent the broker server 208. The provider 206 can use the third device 108.

As discussed above, the broker server 202 can know the provider identity 238 but the client information 210 can remain unknown to the broker server 202, the provider 206, or a combination thereof. Moreover, the broker server 202 can know the provider identity 238 representing the provider location indicator 234 of the provider 206, an activity history of the provider 206, a profile of the provider 206, or a combination thereof. Additionally, the broker server 202 can store the provider key 256 and the provider notification 204.

As discussed above, for example, the provider 206 and the broker server 208 can represent the same entity. More specifically, the provider 206 and the broker server 208 can both be represented by either the second device 106 or the third device 108.

The following example depicts the process steps for conducting the private location equality testing. The steps can be depicted as ordinal starting from "Step 0" or "Step 1." The provider key 256 can represent "Kad" and the provider location indicator 234 can represent "X. The provider notification 204 can represent "Ads." The broker server 208 can know "Kad" and "X." The broker server 208 can also know "Ads." The first device 102 of the anonymous client 202 can store the client key 250 representing "Ku" and the client location indicator 222 representing "Y."

"Step 0" can be optional if the provider 206 and the broker server 208 are represented as the same entity. Furthermore, "Step 0" can represent a pre-step before conducting the private location equality testing. The broker server 202 can pre-store the provider encryption data 258 representing the provider location indicator 234 encrypted by the provider key 256. The provider encryption data 258 can represent "(X)Kad." The broker server 208 can also pre-store the provider notification 204 encrypted with the provider testable representation 246 to generate an encrypted notification 502. The encrypted notification 502 is the provider notification 204 encrypted with the provider testable representation 246. The encrypted notification 502 can be encrypted with the provider testable representation 246 representing "x," which can be derived from the provider location indicator 234 of "X."

"Step 1" can represent the anonymous client 202 sending the client encryption data 248 representing the client location indicator 222 of "Y" encrypted by the client key 250 of "Ku" to the broker server 208. The client encryption data 248 can represent "(Y)Ku."

"Step 2" can represent the broker server 208 responding to the anonymous client 202. The broker server 208 can send the following to the anonymous client 202: the client encryption data 248 encrypted by the provider key 256 to represent "((Y)Ku)Kad"; the provider encryption data 258 of "(X)Kad"; the provider notification 204 encrypted with the provider key 256 of "(Ads)x"; or a combination thereof.

"Step 3" can represent the comparison proceeding 264 for determining the comparison result 266. The first device 102 of the anonymous client 202 can perform "Step 3" to conduct the private location equality testing. More specifically, the first device 102 can compare the provider encryption data 258 encrypted by the client key 250 ("((X)Kad)Ku") to the client encryption data 248 encrypted by the provider key 256 "((Y)Ku)Kad)" to determine the comparison result 266. If the comparison result 266 is "success," thus the provider location indicator 234 and the client location indicator 222 are the match 272 of FIG. 2, the anonymous client 202 can send the fetch request 268 to the provider 206 for requesting directly for the provider notification 204 from the provider 206.

Optionally, if the broker server 208 had send the provider notification 204 encrypted with the provider key 256 of "(Ads)x," the anonymous client 202 can decrypt the provider notification 204 of "Ads" with the client location indicator 222 of "Y" because the provider location indicator 234 and the client location indicator 222 are the match 272 or "Y=X." As a result, the anonymous client 202 can view the provider notification 204 and select or click on the provider notification 204. The provider 206 can receive the selection or the click by the anonymous client 202 to calculate the customer lead 270. If the provider 206 receives the selection or the click of the provider notification 204 by the anonymous client 202, the provider 206 can calculate the customer lead 270 based on the clicks instead of counting the fetch request 268.

Figure 6:
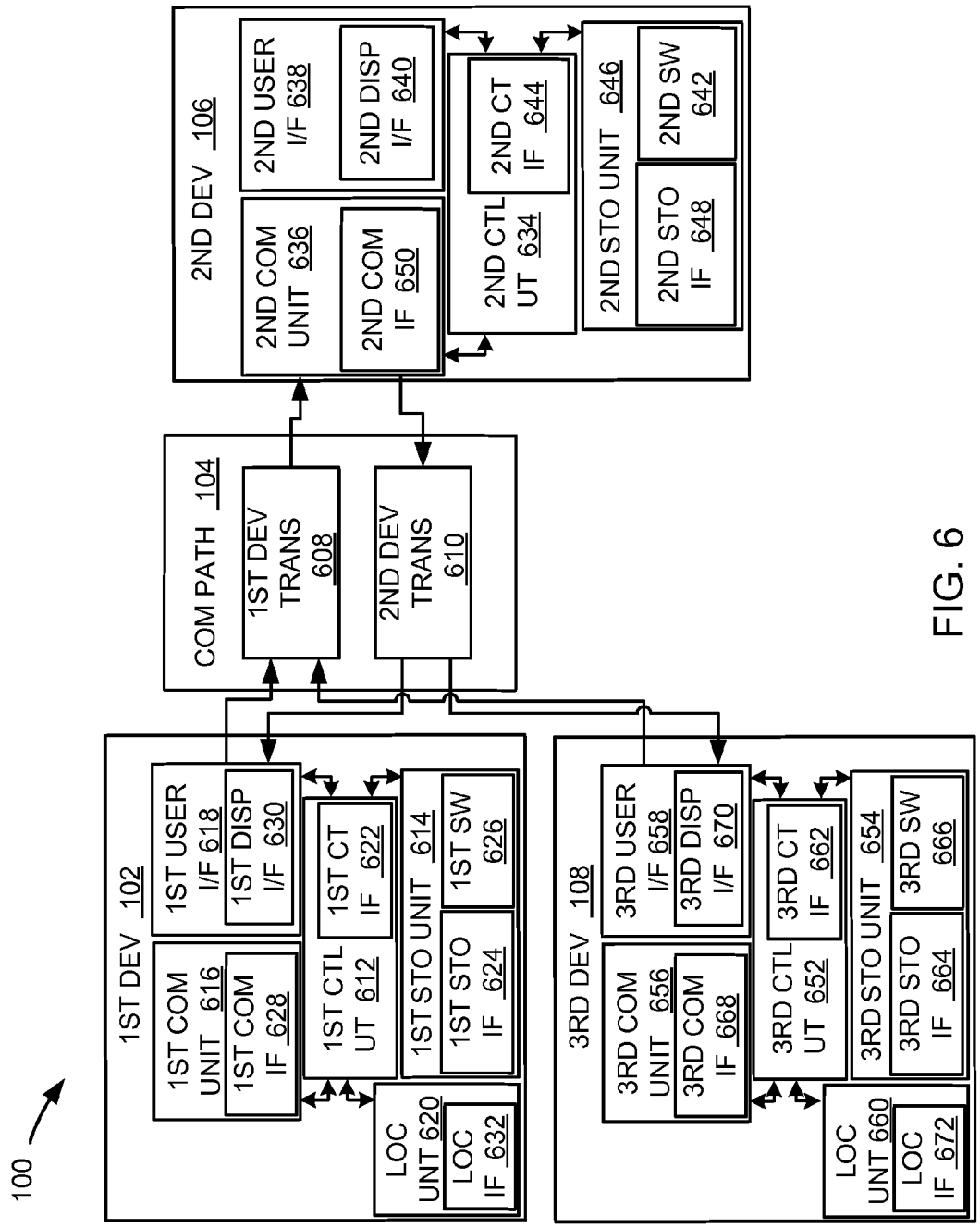
FIG. 6 is an exemplary block diagram of the information delivery system.

Referring now to FIG. 6, therein is shown an exemplary block diagram of the information delivery system 100. The information delivery system 100 can include the first device 102, the third device 108, the communication path 104, and the second device 106. The first device 102 or the third device 108 can send information in a first device transmission 608 over the communication path 104 to the second device 106. The second device 106 can send information in a second device transmission 610 over the communication path 104 to the first device 102 or the third device 108.

For illustrative purposes, the information delivery system 100 is shown with the first device 102 or the third device 108 as a client device, although it is understood that the information delivery system 100 can have the first device 102 or the third device 108 as a different type of device. For example, the first device 102 or the third device 108 can be a server having a display interface.

Also for illustrative purposes, the information delivery system 100 is shown with the second device 106 as a server, although it is understood that the information delivery system 100 can have the second device 106 as a different type of device. For example, the second device 106 can be a client device.

For brevity of description in this embodiment of the present invention, the first device 102 or the third device 108 will be described as a client device and the second device 106 will be described as a server device. The embodiment of the present invention is not limited to this selection for the type of devices. The selection is an example of the present invention.

The first device 102 can include a first control unit 612, a first storage unit 614, a first communication unit 616, a first user interface 618, and a location unit 620. The first control unit 612 can include a first control interface 622. The first control unit 612 can execute a first software 626 to provide the intelligence of the information delivery system 100.

The first control unit 612 can be implemented in a number of different manners. For example, the first control unit 612 can be a processor, an application specific integrated circuit (ASIC) an embedded processor, a microprocessor, a hardware control logic, a hardware finite state machine (FSM), a digital signal processor (DSP), or a combination thereof. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations physically separate from to the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system (MEMS), optical circuitry, waveguides, wireless circuitry, wireline circuitry, or a combination thereof.

The location unit 620 can generate location information, current heading, and current speed of the first device 102, as examples. The location unit 620 can be implemented in many ways. For example, the location unit 620 can function as at least a part of a global positioning system (GPS), an inertial navigation system, a cellular-tower location system, a pressure location system, or any combination thereof.

The location unit 620 can include a location interface 632. The location interface 632 can be used for communication between the location unit 620 and other functional units in the first device 102. The location interface 632 can also be used for communication that is external to the first device 102.

The location interface 632 can receive information from the other functional units or from external sources, or can transmit information to the other functional units or to external destinations. The external sources and the external destinations refer to sources and destinations physically separate from the first device 102.

The location interface 632 can include different implementations depending on which functional units or external units are being interfaced with the location unit 620. The location interface 632 can be implemented with technologies and techniques similar to the implementation of the first control interface 622.

The first storage unit 614 can store the first software 626. The first storage unit 614 can also store the relevant information, such as advertisements, points of interest (POI), navigation routing entries, or any combination thereof. The relevant information can also include news, media, events, or a combination thereof from the third party content provider.

The first storage unit 614 can be a volatile memory, a nonvolatile memory, an internal memory, an external memory, or a combination thereof. For example, the first storage unit 614 can be a nonvolatile storage such as non-volatile random access memory (NVRAM), Flash memory, disk storage, or a volatile storage such as static random access memory (SRAM).

The first storage unit 614 can include a first storage interface 624. The first storage interface 624 can be used for communication between and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations physically separate from the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the first device 102 of FIG. 1, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user (not shown) to interface and interact with the first device 102. The first user interface 618 can include an input device and an output device. Examples of the input device of the first user interface 618 can include a keypad, a touchpad, soft-keys, a keyboard, a microphone, an infrared sensor for receiving remote signals, or any combination thereof to provide data and communication inputs.

The first user interface 618 can include a first display interface 630. The first display interface 630 can include a display, a projector, a video screen, a speaker, or any combination thereof.

The first control unit 612 can operate the first user interface 618 to display information generated by the information delivery system 100. The first control unit 612 can also execute the first software 626 for the other functions of the information delivery system 100, including receiving location information from the location unit 620. The first control unit 612 can further execute the first software 626 for interaction with the communication path 104 via the first communication unit 616.

The second device 106 can be optimized for implementing the embodiment of the present invention in a multiple device embodiment with the second device 106. The second device 106 can provide the additional or higher performance processing power compared to the first device 102. The second device 106 can include a second control unit 634, a second communication unit 636, and a second user interface 638.

The second user interface 638 allows a user (not shown) to interface and interact with the second device 106. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the information delivery system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the information delivery system 100, including operating the second communication unit 636 to communicate with the second device 106 over the communication path 104.

The second control unit 634 can be implemented in a number of different manners. For example, the second control unit 634 can be a processor, an embedded processor, a microprocessor, hardware control logic, a hardware finite state machine (FSM), a digital signal processor (DSP), or a combination thereof.

The second control unit 634 can include a second control interface 644. The second control interface 644 can be used for communication between the second control unit 634 and other functional units in the second device 106. The second control interface 644 can also be used for communication that is external to the second device 106.

The second control interface 644 can receive information from the other functional units or from external sources, or can transmit information to the other functional units or to external destinations. The external sources and the external destinations refer to sources and destinations physically separate from the second device 106.

The second control interface 644 can be implemented in different ways and can include different implementations depending on which functional units or external units are being interfaced with the second control interface 644. For example, the second control interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the information delivery system 100 is shown with the second storage unit 646 as a single hierarchy storage system, although it is understood that the information delivery system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as non-volatile random access memory (NVRAM), Flash memory, disk storage, or a volatile storage such as static random access memory (SRAM).

The second storage unit 646 can include a second storage interface 648. The second storage interface 648 can be used for communication between other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations physically separate from the second device 106.

The second storage interface 648 can include different implementations depending on which functional units or external units are being interfaced with the second storage unit 646. The second storage interface 648 can be implemented with technologies and techniques similar to the implementation of the second control interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second control interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The information delivery system 100 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The third device 108 can include a third control unit 652, a third storage unit 654, a third communication unit 656, a third user interface 658, and a location unit 660. The third control unit 652 can include a third control interface 662. The third control unit 652 can execute a third software 666 to provide the intelligence of the information delivery system 100. The third control unit 652 can be implemented in a number of different manners. For example, the third control unit 652 can be a processor, an embedded processor, a microprocessor, a hardware control logic, a hardware finite state machine (FSM), a digital signal processor (DSP), or a combination thereof. The third control interface 662 can be used for communication between the third control unit 652 and other functional units in the third device 108. The third control interface 662 can also be used for communication that is external to the third device 108.

The third control interface 662 can receive information from the other functional units or from external sources, or can transmit information to the other functional units or to external destinations. The external sources and the external destinations refer to sources and destinations physically separate to the third device 108.

The third control interface 662 can be implemented in different ways and can include different implementations depending on which functional units or external units are being interfaced with the third control interface 662. For example, the third control interface 662 can be implemented with a pressure sensor, an inertial sensor, a microelectromechanical system (MEMS), optical circuitry, waveguides, wireless circuitry, wireline circuitry, or a combination thereof.

The location unit 660 can generate location information, current heading, and current speed of the third device 108, as examples. The location unit 660 can be implemented in many ways. For example, the location unit 660 can function as at least a part of a global positioning system (GPS), an inertial navigation system, a cellular-tower location system, a pressure location system, or any combination thereof.

The location unit 660 can include a location interface 672. The location interface 672 can be used for communication between the location unit 660 and other functional units in the third device 108. The location interface 672 can also be used for communication that is external to the third device 108.

The location interface 672 can receive information from the other functional units or from external sources, or can transmit information to the other functional units or to external destinations. The external sources and the external destinations refer to sources and destinations physically separate to the third device 108.

The location interface 672 can include different implementations depending on which functional units or external units are being interfaced with the location unit 660. The location interface 672 can be implemented with technologies and techniques similar to the implementation of the third control interface 662.

The third storage unit 654 can store the third software 666. The third storage unit 654 can also store the relevant information, such as advertisements, points of interest (POI), navigation routing entries, or any combination thereof.

The third storage unit 654 can be a volatile memory, a nonvolatile memory, an internal memory, an external memory, or a combination thereof. For example, the third storage unit 654 can be a nonvolatile storage such as non-volatile random access memory (NVRAM), Flash memory, disk storage, or a volatile storage such as static random access memory (SRAM).

The third storage unit 654 can include a third storage interface 664. The third storage interface 664 can be used for communication between the location unit 660 and other functional units in the third device 108. The third storage interface 664 can also be used for communication that is external to the third device 108.

The third storage interface 664 can receive information from the other functional units or from external sources, or can transmit information to the other functional units or to external destinations. The external sources and the external destinations refer to sources and destinations physically separate to the third device 108.

The third storage interface 664 can include different implementations depending on which functional units or external units are being interfaced with the third storage unit 654. The third storage interface 664 can be implemented with technologies and techniques similar to the implementation of the third control interface 662.

The third communication unit 656 can enable external communication to and from the third device 108. For example, the third communication unit 656 can permit the third device 108 to communicate with the second device 106 of FIG. 1, an attachment, such as a peripheral device or a computer desktop, and the communication path 104.

The third communication unit 656 can also function as a communication hub allowing the third device 108 to function as part of the communication path 104 and not limited to be an end point or terminal unit to the communication path 104. The third communication unit 656 can include active and passive components, such as microelectronics or an antenna, for interaction with the communication path 104.

The third communication unit 656 can include a third communication interface 668. The third communication interface 668 can be used for communication between the third communication unit 656 and other functional units in the third device 108. The third communication interface 668 can receive information from the other functional units or can transmit information to the other functional units.

The third communication interface 668 can include different implementations depending on which functional units are being interfaced with the third communication unit 656. The third communication interface 668 can be implemented with technologies and techniques similar to the implementation of the third control interface 662.

The third user interface 658 allows a user (not shown) to interface and interact with the third device 108. The third user interface 658 can include an input device and an output device. Examples of the input device of the third user interface 658 can include a keypad, a touchpad, soft-keys, a keyboard, a microphone, or any combination thereof to provide data and communication inputs.

The third user interface 658 can include a third display interface 670. The third display interface 670 can include a display, a projector, a video screen, a speaker, or any combination thereof.

The third control unit 652 can operate the third user interface 658 to display information generated by the information delivery system 100. The third control unit 652 can also execute the third software 666 for the other functions of the information delivery system 100, including receiving location information from the location unit 660. The third control unit 652 can further execute the third software 666 for interaction with the communication path 104 via the third communication unit 656.

The functional units in the first device 102 can work individually and independently of the other functional units. The first device 102 can work individually and independently from the second device 106, the third device 108, and the communication path 104.

The functional units in the second device 106 can work individually and independently of the other functional units. The second device 106 can work individually and independently from the first device 102, the third device 108, and the communication path 104.

The functional units in the third device 108 can work individually and independently of the other functional units. The third device 108 can work individually and independently from the first device 102, the second device 106, and the communication path 104.

For illustrative purposes, the information delivery system 100 is described by operation of the first device 102, the second device 106, and the third device 108. It is understood that the first device 102, the second device 106, the third device 108 can operate any of the modules and functions of the information delivery system 100. For example, the first device 102 is described to operate the location unit 620, although it is understood that the second device 106 or the third device 108 can also operate the location unit 620.

Figure 7:
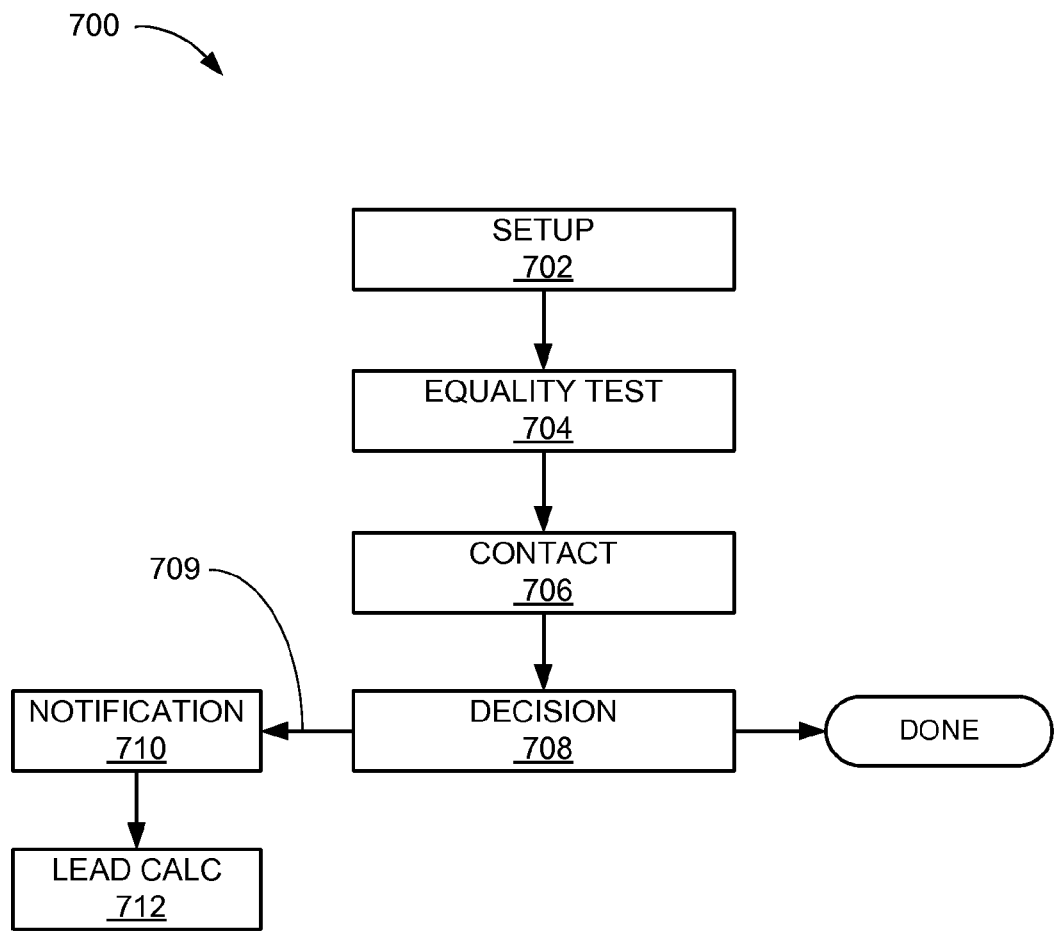
FIG. 7 is a control flow of the information delivery system.

Referring now to FIG. 7, therein is shown a control flow 700 of the information delivery system 100 of FIG. 1. For clarity and brevity, the discussion of the control flow 700 will focus on the first device 102 of FIG. 1, the third device 108 of FIG. 1, or a combination thereof executing the modules. However, the first device 102, the third device 108, or a combination thereof and the second device 106 can be discussed interchangeably. The discussion of the specificity of the modules pertaining to the first device 102, the second device 106, the third device 108, or a combination thereof will be discussed when appropriate.

For further example, the first device 102 can represent the device used by the user representing the anonymous client 202 of FIG. 2. The third device 108 can represent the device used by the user representing the provider 206 of FIG. 2.

The information delivery system 100 can include a setup module 702. The setup module 702 generates the client testable representation 230 of FIG. 2, the provider testable representation 246 of FIG. 2, the encrypted notification 502 of FIG. 5, or a combination thereof. Details regarding the setup module 702 will be discussed below.

The information delivery system 100 can include an equality test module 704, which can couple to the setup module 702. The equality test module 704 generates the comparison result 266 of FIG. 2. For example, the equality test module 704 can generate the comparison result 266 based on comparing the client encryption data 248 of FIG. 2 and the provider encryption data 258 of FIG. 2. More specifically, the equality test module 704 can perform the asymmetric private equality testing protocol for generating the comparison result 266. Details regarding the equality test module 704 will be discussed below. The equality test module 704 can send the comparison result 266 to a decision module 708.

The information delivery system 100 can include a contact module 706, which can couple to the equality test module 704. The contact module 706 sends the provider identity 238 of FIG. 2. For example, the contact module 706 can send the provider identity 238 based on the comparison proceeding 264 of FIG. 2. More specifically, the contact module 706 can send the provider identity 238 based on the client selection 218 of FIG. 2 for the category of interest 212 of FIG. 2. For a specific example, the client selection 218 can represent "Smartphones" for the category of interest 212 for the "Computer & Electronics." The contact module 706 can send the provider identity 238 for the provider 206 providing the provider notification 204 of FIG. 2 related to the category of interest 212. More specifically, the contact module 706 can send the provider identity 238 for the provider 206 involved in the comparison proceeding 264.

The information delivery system 100 can include the decision module 708, which can couple to the contact module 706. The decision module 708 generates a decision step 709. For example, the decision module 708 can generate the decision step 709 based on the comparison result 266.

For a specific example, the decision module 708 can generate the decision step 709 based on the comparison result 266 of "No." If the comparison result 266 represents "No," the provider 206 cannot provide the provider notification 204 interested by the anonymous client 202. As a result, the anonymous client 202 will not be notified by the broker server 208 of FIG. 2 to contact the provider 206. More specifically, the anonymous client 202 will not obtain the encrypted notification 502.

In contrast, if the comparison result 266 represents "Yes," the decision module 708 can generate the decision step 709 to notify the anonymous client 202 by the broker server 208 to contact the provider 206 to request for the provider notification 204. For another example, if the comparison result 266 represents "Yes," the decision module 708 can generate the decision step 709 to notify the anonymous client 202 to decrypt the encrypted notification 502. The encrypted notification 502 can be sent with the client second encryption data 254 of FIG. 2 and the provider first encryption data 260 of FIG. 2 for obtaining the provider notification 204 to the first device 102. The decision module 708 can send the decision step 709 to a notification module 710.

The information delivery system 100 can include the notification module 710, which can couple to the decision module 708. The notification module 710 obtains the provider notification 204. For example, the notification module 710 can generate the fetch request 268 of FIG. 2 for requesting the provider notification 204. For example, the notification module 710 can generate the fetch request 268 based on the comparison result 266 of "Yes."

The notification module 710 can generate the fetch request 268 in a number of ways. For example, the notification module 710 can generate the fetch request 268 based on whether the anonymous client 202 desires to contact the provider directly or not. For a specific example, if the anonymous client 202 desires to contact the provider 206 directly to the third device 108, the notification module 710 can generate the fetch request 268 without the anonymous identity 214 of FIG. 2 or with the client information 210 of FIG. 2 to reveal the identity of the anonymous client 202 to the provider 206. If the anonymous client 202 desires to contact the provider 206 indirectly via the broker server 208, the notification module 710 can generate the fetch request 268 with the anonymous identity 214 to hide the identity of the anonymous client 202 to the provider 206. The notification module 710 can send the fetch request 268 to a lead calculator module 712.

It has been discovered that the information delivery system 100 can conceal the client information 210 of the anonymous client 202 when requesting the provider notification 204 and receive the provider notification 204 relevant to the anonymous client 202. More specifically, the anonymous client 202 can send the fetch request 268 based on the comparison result 266 instead of the provider 206 pushing the provider notification 204 even if the anonymous client 202 does not request for the provider notification 204. As a result, the ability to send the fetch request 268 based on the comparison result 266 improves the relevancy of the provider notification 204 to the anonymous client 202 without increasing the risk of disclosing the client information 210.

For another example, the notification module 710 can obtain the provider notification 204 based on the comparison result 266 of the match 272 of FIG. 2 for displaying on the first device 102. More specifically, if the comparison result 266 is "success," the notification module 710 can obtain the provider notification 204 based on decrypting the encrypted notification 502 with the provider testable representation 246 matching the client testable representation 230.

As discussed above, the encrypted notification 502 can be sent to the first device 102 along with the client second encryption data 254 and the provider first encryption data 260 from the broker server 208. The comparison result 266 can be determined on the first device 102. If the comparison result 266 is the match 272, the notification module 710 can decrypt the encrypted notification 502 as discussed above. As a result, the anonymous client 202 can obtain the provider notification 204 without revealing the client information 210 to the broker server 208.

For further example, the notification module 710 can obtain the provider notification 204 based on decrypting the encrypted notification 502 with the provider location abstraction 240 of FIG. 2 matching the client location abstraction 226 of FIG. 2. For another example, the notification module 710 can obtain the provider notification 204 based on decrypting the encrypted notification 502 with the provider promotion abstraction 242 of FIG. 2 matching the client interest abstraction 228 of FIG. 2.

It has been discovered that the information delivery system 100 can improve the efficiency of obtaining the provider notification 204 by reducing the number of transaction between the anonymous client 202 and the provider 206. By delivering the encrypted notification 502 along with the client second encryption data 254 and the provider first encryption data 260, the anonymous client 202 can obtain the provider notification 204 without sending the fetch request 268. As a result, the information delivery system 100 can improve the efficiency of the anonymous client 202 obtaining the provider notification 204 and also continue to conceal the client information 210 from the broker server 208, the provider, 206, or a combination thereof.

The information delivery system 100 can include the lead calculator module 712, which can couple to the notification module 710. The lead calculator module 712 calculates the customer lead 270 of FIG. 2. For example, the lead calculator module 712 can calculate the customer lead 270 based on the fetch request 268. The provider 206 can provide the provider notification 204 having the operator of the broker server 208, such as website Uniform Resource Locator (URL) representing "bestbuySamsung.com." More specifically, the lead calculator module 712 can calculate the customer lead 270 based on counting the fetch request 268 received by the provider 206 via the second device 106, directly to the third device 108, or a combination thereof. Furthermore, the lead calculator module 712 can calculate the customer lead 270 based on the conversion of the provider notification 204 having the operator information. By calculating the customer lead 270, the operator of the second device 106 or the broker server 208 can share a profit with the provider 206.

For further example, the lead calculator module 712 can contact the provider 206 on behalf of the anonymous client 202. More specifically, the lead calculator module 712 can receive the fetch request 268 with an anonymous identity 214 for concealing the client information 210 from the provider 206.

For a different example, the lead calculator module 712 can calculate the customer lead 720 based on the client selection 218 of FIG. 2 on the provider notification 204. More specifically, the customer 720 can be calculated based on the client selection 218 representing a "click" on the provider notification 204. The lead calculator module 712 can send the fetch request 268 to the third device 108 for requesting the provider notification 204.

The first software 626 of FIG. 6 of the first device 102 of FIG. 6 can include the information delivery system 100. For example, the first software 626 can include the setup module 702, the equality test module 704, the decision module 708, and the notification module 710.

The first control unit 612 of FIG. 6 can execute the first software 626 for the setup module 702 to generate the client testable representation 230. The first control unit 612 can execute the first software 626 for the equality test module 704 to generate the comparison result 266, the anonymous identity 214, or a combination thereof.

The first control unit 612 can execute the first software 626 for the decision module 708 to generate the decision step 709. The first control unit 612 can execute the first software 626 for the notification module 710 to generate the fetch request 268. The first control unit 612 can execute the first software 626 for the notification module 710 to obtain the provider notification 204. Furthermore, the first control unit 612 can operate the first communication unit 616 of FIG. 6 to obtain the provider notification 204.

The second software 642 of FIG. 6 of the second device 106 of FIG. 6 can include the information delivery system 100. For example, the second software 642 can include the setup module 702, the equality test module 704, the contact module 706, and the decision module 708.

The second control unit 634 of FIG. 6 can execute the second software 642 for the setup module 702 to generate the provider testable representation 246. The second control unit 634 can execute the second software 642 for the equality test module 704 to generate the comparison result 266, the anonymous identity 214, or a combination thereof. The second control unit 634 can execute the second software 642 for the contact module 706 to send the provider identity 238. Furthermore, the second control unit 634 can execute the second communication unit 636 of FIG. 6 to send the provider identity 238, to receive the client encryption data 248, to receive the fetch request 268, or a combination thereof. The second control unit 634 can execute the second software 642 for the decision module 708 to generate the decision step 709. The second control unit 634 can execute the second software 642 for the lead calculator module 712 to calculate the customer lead 270.

The third software 666 of FIG. 6 of the third device 108 of FIG. 6 can include the information delivery system 100. For example, the third software 666 can include the setup module 702 and the lead calculator module 712. The third control unit 652 of FIG. 6 can execute the third software 666 for the setup module 702 to generate the provider testable representation 246. The third control unit 652 can execute the third software 666 for the lead calculator module 712 to calculate the customer lead 270.

The information delivery system 100 can be partitioned between the first software 626, the second software 642, and the third software 666. For example, the second software 642 can include the setup module 702 and the contact module 706. The second control unit 634 can execute modules partitioned on the second software 642 as previously described.

The first software 626 can include the setup module 702, the equality test module 704, the decision module 708, and the notification module 710. Based on the size of the first storage unit 614 of FIG. 6, the first software 626 can include additional modules of the information delivery system 100. The first control unit 612 can execute the modules partitioned on the first software 626 as previously described.

The third software 666 can include the lead calculator module 712. Based on the size of the third storage unit 664 of FIG. 6, the third software 666 can include additional modules of the information delivery system 100. The third control unit 652 can execute the modules partitioned on the third software 666 as previously described.

The first control unit 612 can operate the first communication unit 616 to send the fetch request 268 to the third device 108 and the client testable representation 230 to the second device 106. Further, the first control unit 612 can operate the first communication unit 616 can obtain the provider notification 204 from the second device 106, the third device 108, or a combination thereof. The first control unit 612 can operate the first software 626 to operate the location unit 620. The second communication unit 636 can send the provider testable representation 246 to the first device 102 through the communication path 104 of FIG. 1. The third communication unit 656 of FIG. 6 can send the provider testable representation 246 to the second device 106 through the communication path 104. The first user interface 618 of FIG. 6, the second user interface 638 of FIG. 6, the third user interface 658 of FIG. 6, or a combination thereof can display the provider notification 204.

The information delivery system 100 describes the module functions or order as an example. The modules can be partitioned differently. For example, the equality test module 704 and the decision module 708 can be combined. Each of the modules can operate individually and independently of the other modules. Furthermore, data generated in one module can be used by another module without being directly coupled to each other. For example, the decision module 708 can receive the comparison result 266 from the equality test module 704.

The modules described in this application can be hardware circuitry, hardware implementation, or hardware accelerators in the first control unit 612, the third control unit 652, or in the second control unit 634. The modules can also be hardware circuitry, hardware implementation, or hardware accelerators within the first device 102, the second device 106, or the third device 108 but outside of the first control unit 612, the second control unit 634, or the third control unit 652, respectively as depicted in FIG. 6. However, it is understood that the first control unit 612, the second control unit 634, the third control unit 652, or a combination thereof can collectively refer to all hardware accelerators for the modules.

The modules described in this application can be implemented as instructions stored on a non-transitory computer readable medium to be executed by the first control unit 612, the second control unit 634, the third control unit 652, or a combination thereof. The non-transitory computer medium can include the first storage unit 614, the second storage unit 646 of FIG. 6, the third storage unit 654 of FIG. 6, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the information delivery system 100 or installed as a removable portion of the information delivery system 100.

Figure 8:
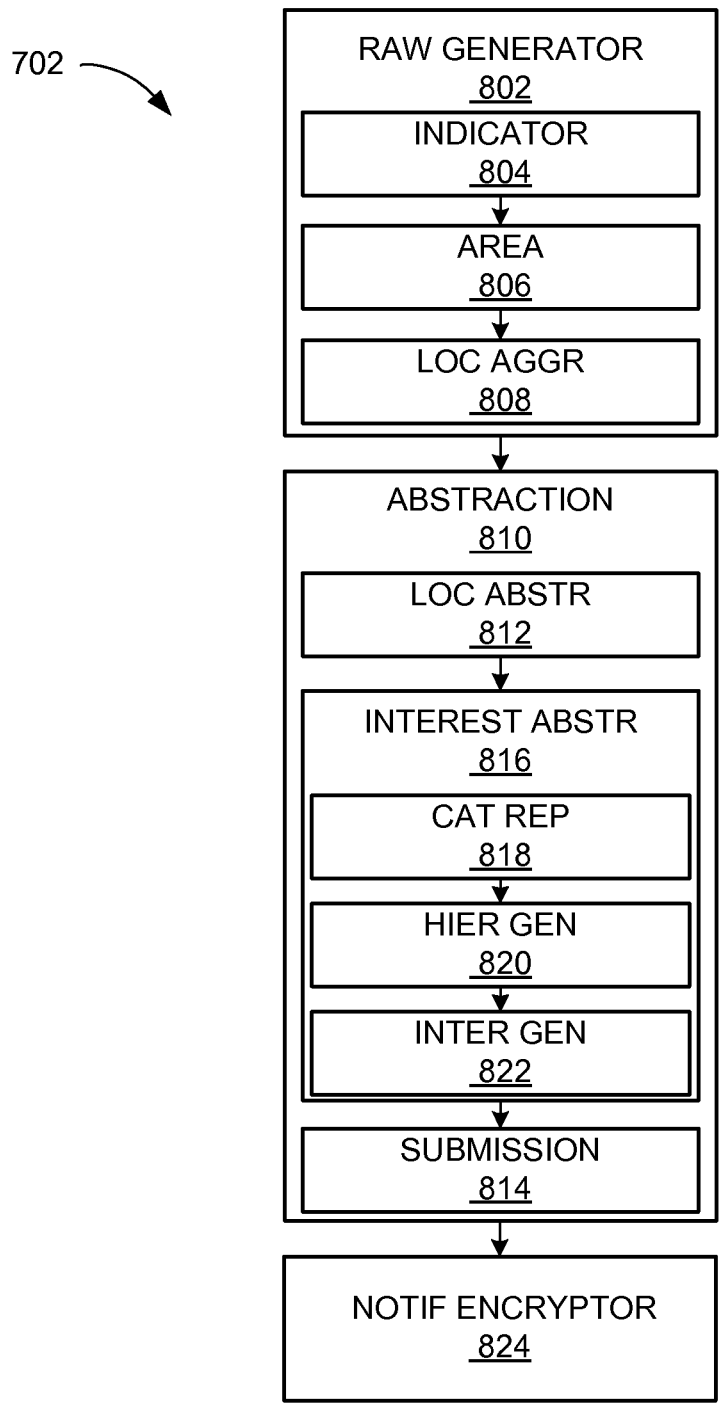
FIG. 8 is a detail flow of the setup module.

Referring now to FIG. 8, therein is shown a detail flow of the setup module 702. The following modules discussed below can represent the modules for the first device 102 of FIG. 1.

The setup module 702 can include a raw generator module 802. The raw generator module 802 generates the client location information 220 of FIG. 2. For example, the raw generator module 802 can generate the client location information 220 based on aggregating the client location indicator 222 of FIG. 2, the client location area 224 of FIG. 2, or a combination thereof.

The raw generator module 802 can generate the client location information 220 in a number of ways. The raw generator module 802 can include an indicator module 804. The indicator module 804 generates the client location indicator 222. For example, the indicator module 804 can generate the client location indicator 222 based on identifying the latitude-longitude information 302 of FIG. 3 of the first device 102 via the location unit 620 of FIG. 6. The indicator module 804 can send the client location indicator 222 to an area module 806.

The raw generator module 802 can include the area module 806, which can couple to the indicator module 804. The area module 806 generates the client location area 224. For example, the area module 806 can generate the client location area 224 based on dividing a geographic region into the geographic boundary 304 of FIG. 3.

The area module 806 can generate the client location area 224 in a number of ways. For example, the area module 806 can generate the client location area 224 based on dividing the geographic region based on the latitude-longitude information 302, the geographic boundary 304, or a combination thereof. More specifically, the area module 806 can generate the client location area 224 by establishing the geographic boundary 304 within the geographic region with a plurality of the latitude-longitude information 302. The plurality of the latitude-longitude information 302 can represent the vertices of the geographic boundary 304. The plurality of the latitude-longitude information 302 can be connected to establish the geographic boundary 304. The area module 806 can generate the client location area 224 based on the shape of the geographic boundary 304. The shape of the client location area 224 can represent an amorphous shape, a polygon, such as a rectangle or a triangle, a circle, or a combination thereof.

For a different example, the area module 806 can generate a plurality of the client location area 224 based on determining the neighboring area 306 of FIG. 3. More specifically, the area module 806 can determine the neighboring area 306 by identifying the borderline 308 of FIG. 3 of the client location area 224. For example, if two instances of the client location area 224 share the borderline 308, one instance of the client location area 224 can represent the neighboring area 306 to another instance of the client location area 224.

For a different example, the area module 806 can generate the client location area 224 including the client location indicator 222. More specifically, the area module 806 can generate the client location indicator 222 based on establishing the geographic boundary 304 surrounding the client location indicator 222. The area module 806 can send the client location area 224 to a location aggregator module 808.

The raw generator module 802 can include the location aggregator module 808, which can couple to the area module 806. The location aggregator module 808 generates the client location information 220. For example, the location aggregator module 808 can generate the client location information 220 based on aggregating the client location information 220 based on aggregating the client location indicator 222, the client location area 224, or a combination thereof. More specifically, the location aggregator module 808 can generate the client location information 220 having the client location indicator 222 without the client location area 224 or vice versa. The location aggregator module 808 can send the client location information 220 to an abstraction module 810.

The setup module 702 can include the abstraction module 810. The abstraction module 810 generates the client testable representation 230 of FIG. 2. For example, the abstraction module 810 can generate the client testable representation 230 based on aggregating the client location abstraction 226 of FIG. 2, the client interest abstraction 228 of FIG. 2, or a combination thereof.

The abstraction module 810 can generate the client testable representation 230 in a number of ways. The abstraction module 810 can include a location abstractor module 812. The location abstractor module 812 generates the client location abstraction 226. For example, the location abstractor module 812 can generate the client location abstraction 226 based on abstracting the client location information 220.

The location abstractor module 812 can generate the client location abstraction 226 in a number of ways. For example, the location abstractor module 812 can generate the client location abstraction 226 by assigning the location identifier 310 of FIG. 3. For a specific example, the location abstractor module 812 can generate the client location abstraction 226 by assigning the location identifier 310 to distinguish the client location area 224 representing the containing area 312 of FIG. 3 from the neighboring area 306 representing the non-containing area 314 of FIG. 3. The location identifier 310 can represent an alphabet value. The location identifier 310 can represent the first letter in the alphabet for the containing area 312 with the client location indicator 222. The location identifier 310 can represent the subsequent letter in the alphabet for the non-containing area 314.

For a specific example, the location abstractor module 812 can generate the client location abstraction 226 for the containing area 312 by assigning the location identifier 310 of "A." The location abstractor module 812 can generate the client location abstraction 226 for the non-containing area 314 by assigning the location identifier 310 of "B." For further example, the location abstractor module 812 can generate a plurality of the client location abstraction 226 according to the number of the non-containing area 314 representing the neighboring area 306 to the containing area 312. The location abstractor module 812 can send the client location abstraction 226 to a submission module 814.

The abstraction module 810 can include an interest abstractor module 816, which can couple to the location abstractor module 812. The interest abstractor module 816 generates the client interest abstraction 228. For example, the interest abstractor module 816 can generate the client interest abstraction 228 based on the client selection 218 of FIG. 2, the preference hierarchy 402 of FIG. 4, or a combination thereof.

The interest abstractor module 816 can generate the client interest abstraction 228 in a number of ways. The interest abstractor module 816 can include a category representation module 818. The category representation module 818 generates the category representation 406 of FIG. 4, the subcategory representation 410 of FIG. 4, or a combination. For example, the category representation module 818 can generate the category representation 406, the subcategory representation 410, or a combination thereof by assigning the category identifier 408 of FIG. 4 to the category of interest 212 of FIG. 2 according to the category scheme 404 of FIG. 4.

For a specific example, the category of interest 212 can represent "Computer & Electronics." One instance of the category scheme 404 for the category of interest 212 can represent the following: Computer & Electronics→Client Electronics→Gadgets & Portable Electronics→PDA & Handhelds→Tablets. Another instance of the category scheme 404 for the category of interest 212 can represent the following: Computer & Electronics→Client Electronics→Gadgets & Portable Electronics→PDA & Handhelds Smartphones. The category identifier 408 can represent a numerical value.

The category representation module 818 can generate the category representation 406, the subcategory representation 410, or a combination thereof by assigning the category identifier 408 to establish a hierarchy for the category scheme 404. More specifically, the category identifier 408 can represent a lowest numerical value for a top instance of the category scheme 404 and higher numerical value for a subsequent instance of the category scheme 404 within the same instance of the category of interest 212.

For example, the category representation module 818 can generate the category representation 406 by assigning the category identifier 408 of "1" for "Computer & Electronics." The category representation module 818 can generate the subcategory representation 410 by assigning the category identifier 408 of "2" for "Client Electronics," the category identifier 408 of "3" for "Gadgets & Portable Electronics," the category identifier 408 of "4" for "PDA & Handhelds," the category identifier 408 of "5" for "Tablets," and the category identifier 408 of "6" for "Smartphones." The category representation module 818 can send the category representation 406, the subcategory representation 410, or a combination thereof to a hierarchy generator module 820.

The interest abstractor module 816 can include the hierarchy generator module 820. The hierarchy generator module 820 generates the preference hierarchy 402. For example, the hierarchy generator module 820 can generate the preference hierarchy 402 based on the category representation 406, the subcategory representation 410, the category scheme 404, or a combination thereof for the category of interest 212.

More specifically, the hierarchy generator module 820 can generate the preference hierarchy 402 based on organizing the category representation 406, the subcategory representation 410, or a combination thereof according to the category scheme 404. For a specific example, the hierarchy generator module 820 can generate one instance of the preference hierarchy 402 as the following: Computer & Electronics (1); Client Electronics (2); Gadgets & Portable Electronics (3); PDA & Handhelds (4); and Tablets (6). The hierarchy generator module 820 can generate another instance of the preference hierarchy 402 as the following: Computer & Electronics (1); Client Electronics (2); Gadgets & Portable Electronics (3); PDA & Handhelds (4); and Smartphones (7). The hierarchy generator module 820 can send the preference hierarchy 402 to an interest generator module 822.

The interest abstractor module 816 can include the interest generator module 822, which can couple to the hierarchy generator module 820. The interest generator module 822 generates the client interest abstraction 228. For example, the interest generator module 822 can generate the client interest abstraction 228 based on the client selection 218, the preference hierarchy 402, or a combination thereof.

The interest generator module 822 can generate the client interest abstraction 228 in a number of ways. For example, the client selection 218 can represent the "Smartphones"

from the preference hierarchy 402. The interest generator module 822 can generate the client interest abstraction 228 by abstracting the client selection 218 for the "Smartphones" as "testable data 7."

For another example, the interest generator module 822 can generate a plurality of the client interest abstraction 228 based on the hierarchy level 412 of FIG. 4 where the client selection 218 was made. More specifically, the interest generator module 822 can generate the plurality of the client interest abstraction 228 by abstracting from the hierarchy level 412 where the client selection 218 was made. For a specific example, the client selection 218 can be made at the hierarchy level 412 of "Gadgets & Portable Electronics" from the preference hierarchy 402. The user of the first device 102 can be interested in choosing from Tablets or Smartphones. The interest generator module 822 can generate the client interest abstraction 228 for "Gadgets & Portable Electronics" as "testable data 3, for "PDA & Handhelds" as "testable data 4," for "Tablets" as "testable data 6," and for "Smartphones" as "testable data 7." The interest generator module 822 can send the client interest abstraction 228 to the submission module 814.

The abstraction module 810 can include the submission module 814, which can couple to the location abstractor module 812, the interest abstractor module 816, or a combination thereof. The submission module 814 generates the client testable representation 230. For example, the submission module 814 can generate the client testable representation 230 based on aggregating the client location abstraction 226, the client interest abstraction 228, or a combination thereof.

The submission module 814 can generate the client testable representation 230 in a number of ways. For example, as discussed above, the submission module 814 can generate the client testable representation 230 based on aggregating the client location abstraction 226 and the client interest abstraction 228. For a different example, the submission module 814 can generate the client testable representation 230 having the client location abstraction 226 without the client interest abstraction 228 or vice versa. The submission module 814 can send the client testable representation 230 to the equality test module 704.

It has been discovered that the information delivery system 100 of FIG. 1 generating the client testable representation 230 can improve concealing the client information 210. By generating the client testable representation 230, the client information 210 will remain unknown to the provider 206 of FIG. 2. As a result, the improved concealment results in the prevention from the provider 206 from tracking the anonymous client 202 for desiring the provider notification 204 of FIG. 2.

The following modules discussed below can represent the modules for the third device 108 of FIG. 1. The third device 108 can include the same modules as discussed above in the first device 102. For illustrative purposes, the setup module 702 is shown with the raw generator module 802 generating the client location information 220, although it is understood the raw generator module 802 can be operated differently. For example, the raw generator module 802 can generate the provider location information 232 of FIG. 2. For a specific example, the raw generator module 802 can generate the provider location information 232 based on aggregating the provider location indicator 234 of FIG. 2, the provider location area 236 of FIG. 2, or a combination thereof.

The raw generator module 802 can generate the provider location information 232 similarly as generating the client location information 220. For example, for illustrative purposes, the setup module 702 is shown with the indicator module 804 generating the client location indicator 222, although it is understood the indicator module 804 can be operated differently. For a specific example, the indicator module 804 can generate the provider location indicator 234 similarly as generating the client location indicator 222.

For illustrative purposes, the setup module 702 is shown with the area module 806 generating the client location area 224, although it is understood the area module 806 can be operated differently. For example, the area module 806 can generate the provider location area 236 similarly as generating the client location area 224. For illustrative purposes, the setup module 702 is shown with the location aggregator module 808 generating the client location information 220, although it is understood the location aggregator module 808 can be operated differently. For example, the location aggregator module 808 can generate the provider location information 232 similarly as generating the client location information 220.

For illustrative purposes, the setup module 702 is shown with the abstraction module 810 generating the client testable representation 230, although it is understood the abstraction module 810 can be operated differently. For example, the abstraction module 810 can generate the provider testable representation 246 of FIG. 2. For a specific example, the abstraction module 810 can generate the provider testable representation 246 based on aggregating the provider location abstraction 240 of FIG. 2, the provider promotion abstraction 242 of FIG. 2, or a combination thereof.

The abstraction module 810 can generate the provider testable representation 246 similarly as generating the client testable representation 230. For example, for illustrative purposes, the setup module 702 is shown with the location abstractor module 812 generating the client location abstraction 226, although it is understood the location abstractor module 812 can be operated differently. For a specific example, the location abstractor module 812 can generate the provider location abstraction 240 similarly as generating the client location abstraction 226.

For illustrative purposes, the setup module 702 is shown with the interest abstractor module 816 generating the client interest abstraction 228, although it is understood the interest abstractor module 816 can be operated differently. For example, the interest abstractor module 816 can generate the provider promotion abstraction 242 similarly as generating the client interest abstraction 228.

For further example, the interest abstractor module 816 can generate the provider promotion abstraction 242 based on the promotion availability 244 of FIG. 2, the client selection 218, or a combination thereof. More specifically, if the client selection 218 is made for "Tablets" or "Smartphones" and the promotion availability 244 is true for "Tablets" or "Smartphones," the interest abstractor module 816 can generate the provider promotion abstraction 242.

For illustrative purposes, the setup module 702 is shown with the submission module 814 generating the client testable representation 230, although it is understood the submission module 814 can be operated differently. For example, the submission module 814 can generate the provider testable representation 246 based on the provider promotion abstraction 242 similarly as generating the client testable representation 230. The submission module 814 can send the provider testable representation 246 to the equality test module 704 in the second device 106 of FIG. 1. For a different example, the provider testable representation 246 can be stored on the second storage unit 646 of FIG. 6. More specifically, the setup module 702 can provide the provider testable representation 246 for revealing the provider identity 238 of FIG. 2. For further example, the setup module 702 can provide the provider key 256 for generating the client second encryption data 254 of FIG. 2.

The setup module 702 can include a notification encryptor module 824. The notification encryptor module 824 generates the encrypted notification 502 of FIG. 5. For example, the notification encryptor module 824 can generate the encrypted notification 502 based on encrypting the provider notification 204 with the provider testable representation 246.

The notification encryptor module 824 can generate the encrypted notification 502 in a number of ways. For example, the notification encryptor module 824 can generate the encrypted notification 502 based on encrypting the provider notification 204 with the provider location abstraction 240. For another example, the notification encryptor module 824 can generate the encrypted notification 502 based on encrypting the provider notification 204 with the provider promotion abstraction 242.

The physical transformation for determining the client location information 220 results in the movement in the physical world, such as people using the first device 102, based on the operation of the information delivery system 100. As the movement in the physical world occurs, the movement itself creates additional information that is converted back into updating the client testable representation 230, for updating the containing area 312 and the non-containing area 314 for the continued operation of the information delivery system 100 and to continue movement in the physical world.

Figure 9:
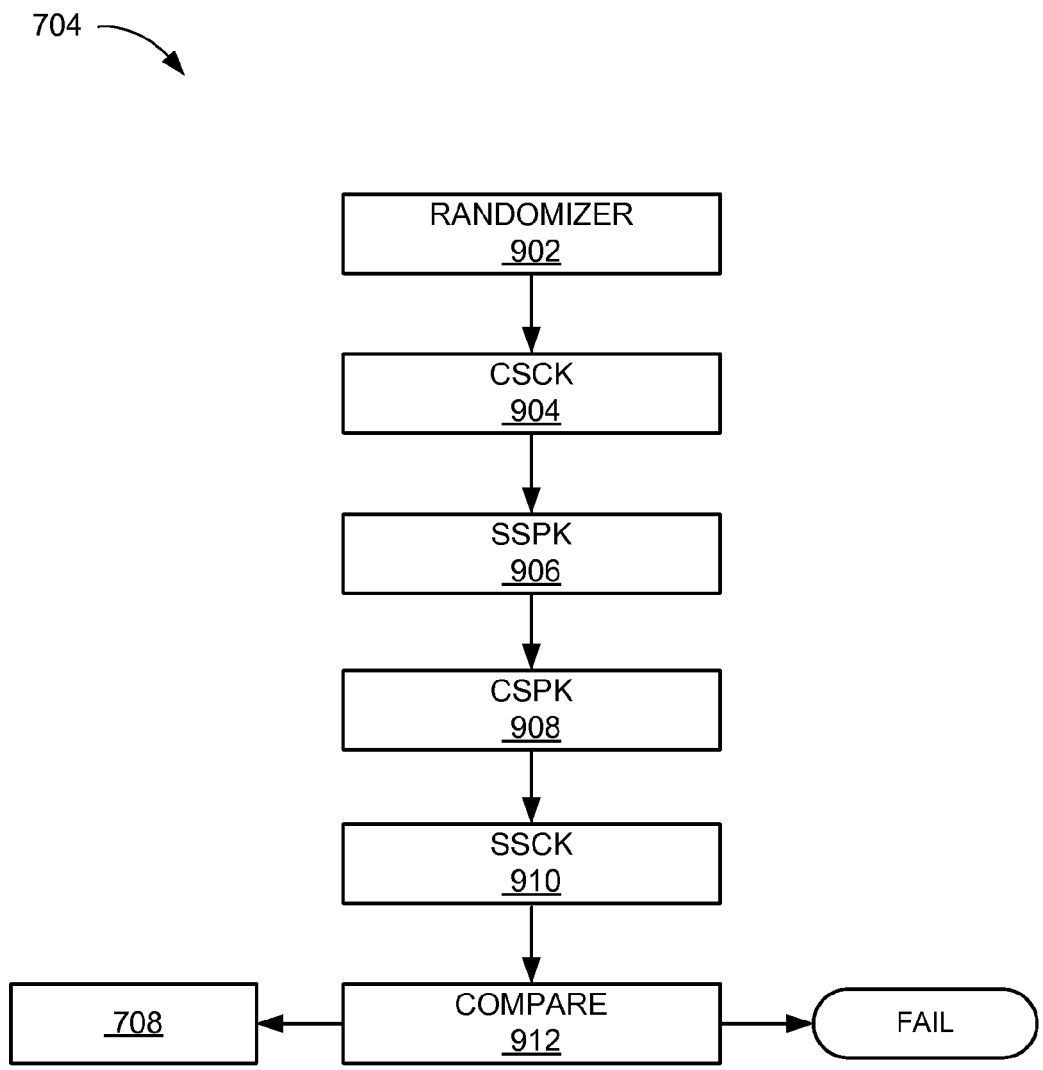
FIG. 9 is a detail flow of the equality test module.

Referring now to FIG. 9, therein is shown a detail flow of the equality test module 704. For brevity and clarity, the embodiment of the present invention can have equality test module 704 reside within the first device 102 of FIG. 1, the second device 106 of FIG. 1, the third device 108, or a combination thereof. The equality test module 704 can include a randomizer module 902. The randomizer module 902 generates the anonymous identity 214 of FIG. 2. For example, the randomizer module 902 can generate the anonymous identity 214 based on the randomizing the client information 210 of FIG. 2. More specifically, the randomizer module 902 can generate the anonymous identity 214 based on assigning the random identifier 216 of FIG. 2 to the client information 210. For example, the random identifier 216 can represent a numerical value. The randomizer module 902 can generate the anonymous identity 214 based on assigning the random identifier 216 representing a random numerical value to the client information 210. The randomizer module 902 can send the anonymous identity 214 to a client side client key module 904.

The equality test module 704 can include a client side client key module 904, which can couple to the randomizer module 902. The client side client key module 904 can reside within the first device 102. The client side client key module 904 generates the client encryption data 248 of FIG. 2. For example, the client side client key module 904 can generate the client encryption data 248 representing the client first encryption data 252 of FIG. 2. More specifically the client side client key module 904 can generate the client first encryption data 252 based on encrypting the client testable representation 230 of FIG. 2 with the client key 250 of FIG. 2, such as the public key.

For example, the client key 250 can represent "$E_A$" and the client testable representation 230 can represent "X." The client side client key module 904 can generate the client first encryption data 252 to represent "$E_A(X)$" based on the client key 250 and the client testable representation 230. The client side client key module 904 can send the client first encryption data 252 to a server side client key module 910.

The equality test module 704 can include a server side provider key module 906, which can couple to the client side client key module 904. The server side provider key module 906 can reside within the second device 106. The server side provider key module 906 generates the provider encryption data 258 of FIG. 2. For example, the server side provider key module 906 can generate the provider encryption data 258 representing the provider first encryption data 260 of FIG. 2. More specifically, the server side provider key module 906 can generate the provider first encryption data 260 based on encrypting the provider testable representation 246 of FIG. 2 with the provider key 256 of FIG. 2, such as the public key.

For example, the provider key 256 can represent "$E_B$" and the provider testable representation 246 can represent "X." The server side provider key module 906 can generate the provider first encryption data 260 to represent "$E_B(X)$" based on the provider key 256 and the provider testable representation 246. The server side provider key module 906 can pre-store the provider first encryption data 260 to represent "$E_B(X)$" based on the provider key 256 and the provider testable representation 246. The server side provider key module 906 can send the provider first encryption data 260 to a client side provider key module 908.

The equality test module 704 can include the client side provider key module 908, which can couple to the server side provider key module 906. The client side provider key module 908 can reside within the first device 102. The client side provider key module 908 generates the provider encryption data 258. For example, the client side provider key module 908 can generate the provider encryption data 258 representing the provider second encryption data 262 of FIG. 2. More specifically, the client side provider key module 908 can generate the provider second encryption data 262 based on encrypting the provider first encryption data 260 with the client key 250, such as the public key. For example, the client key 250 can represent "$E_A$" and the provider first encryption data 260 can represent "$E_B(X)$." The client side provider key module 908 can generate the provider second encryption data 262 to represent "$E_A(E_B(X))$" based on the client key 250 and provider first encryption data 260. The client side provider key module 908 can send the provider second encryption data 262 to a compare module 912.

The equality test module 704 can include the server side client key module 910, which can couple to the client side provider key module 908. The server side client key module 910 can reside within the second device 106. The server side client key module 910 generates the client encryption data 248. For example, the server side client key module 910 can generate the client encryption data 248 representing the client second encryption data 254 of FIG. 2. More specifically, the server side client key module 910 can generate the client second encryption data 254 based on encrypting the client first encryption data 252 with the provider key 256, such as the public key.

For example, the provider key 256 can represent "$E_B$" and the client first encryption data 252 can represent "$E_A(X)$." The server side client key module 910 can generate the client second encryption data 254 to represent "$E_B(E_A(X))$" based on the provider key 256 and the client first encryption data 252. The server side provider key module 906 can send the client second encryption data 254 to the compare module 912.

The equality test module 704 can include the compare module 912, which can couple to the server side client key module 910. The compare module 912 generates the comparison result 266 of FIG. 2. For example, the compare module 912 can generate the comparison result 266 based on comparing the client second encryption data 254 to the provider second encryption data 262. More specifically, the compare module 912 can perform the private equality testing for generating the comparison result 266.

The compare module 912 can generate the comparison result 266 in a number of ways. For example, as discussed above, the compare module 912 can generate the comparison result 266 based on comparing the client second encryption data 254 representing "$E_B(E_A(X))$" to the provider second encryption data 262 representing "$E_A(E_B(X))$". For this example, the client testable representation 230 and the provider testable representation 246 can both represent "X" or equivalent. As a result, the compare module 912 can generate the comparison result 266 of "success." In contrast, if the client testable representation 230 represents "X" but the provider testable representation 246 represents "Y" thus unequal, the compare module 912 can generate the comparison result 266 of "fail."

For further example, the compare module 912 can perform the private equality test repeatedly for each instances of the client testable representation 230. For a specific example, the client testable representation 230 can represent the client location abstraction 226 of FIG. 2 representing the client location indicator 222 of FIG. 2, the client interest abstraction 228 of FIG. 2 representing the client selection 218 of FIG. 2, or a combination thereof. More specifically, the client location indicator 222 can represent "San Jose, Calif. (CA)." The client selection 218 can represent "Smartphones." The compare module 912 can generate the comparison result 266 by performing the private equality testing for "San Jose, Calif.," "Smartphones," or a combination thereof. The compare module 912 can generate the comparison result 266 by comparing the client second encryption data 254 representing "$E_B(E_A(\text{San Jose}))$" to the provider second encryption data 262 "$E_A(E_B(\text{San Jose}))$." The compare module 912 can also generate the comparison result 266 by comparing the client second encryption data 254 representing "$E_B(E_A(\text{Smartphones}))$" to the provider second encryption data 262 "$E_A(E_B(\text{Smartphones}))$."

The compare module 912 can generate the comparison result 266 of "success" if one instance of the client testable representation 230 compared found the match 272 of FIG. 2 with the provider testable representation 246. For a different example, the compare module 912 can generate the comparison result 266 of "success" if all instances of the client testable representation 230 compared found the match 272 with the respective instance of the provider testable representation 246. In other words, the compare module 912 can generate the comparison result 266 of "fail" if one instance of the client testable representation 230 compared found to be unequal with the provider testable representation 246. For a different example, the compare module 912 can generate the comparison result 266 of "fail" if all instances of the client testable representation 230 compared found to be unequal with the respective instances of the provider testable representation 246.

For another example, the compare module 912 can generate the comparison result 266 based on comparing the client testable representation 230 representing the client interest abstraction 228 to the provider promotion abstraction 242 according to the preference hierarchy 402. As discussed above, the preference hierarchy 402 can represent the following: Computer & Electronics (1); Client Electronics (2); Gadgets & Portable Electronics (3); PDA & Handhelds (4); and Tablets (6) or Smartphones (7).

The compare module 912 can generate the comparison result 266 in the order specified by the preference hierarchy 402. For example, the compare module 912 can generate the comparison result 266 by comparing the client interest abstraction 228 to the provider promotion abstraction 242 from the lowest instance in the preference hierarchy 402. More specifically, the compare module 912 can perform the private equality test for the client interest abstraction 228 representing Tablets (5) and/or Smartphones (7) to generate the comparison result 266 prior to performing the private equality test for the client interest abstraction 228 representing PDA & Handhelds (4) to generate the comparison result 266. The compare module 912 can perform the private equality test for the client interest abstraction 228 representing each instances of the preference hierarchy 402 until reaching the top instance of preference hierarchy 402. The compare module 912 can send the comparison result 266 to the decision module 708 of FIG. 7.

It has been discovered that the information delivery system 100 of FIG. 1 generating the comparison result 266 can reduce the risk of exposing the client information 210 of FIG. 2 to the provider 206. By only requesting the fetch request 268 of FIG. 2 based on the comparison result 266, the information delivery system 100 can reduce the unnecessary request for the provider notification 204 of FIG. 2. As a result, the reduction in risk enhances the user experience for operating the first device 102 and the information delivery system 100.

The control flow 700 of FIG. 7 is an embodiment of the present invention. The control flow 700 or a method 700 includes: generating an anonymous identity with a control unit for concealing client information of an anonymous client from a provider; generating a comparison result for determining whether a client encryption data of the anonymous identity matches with a provider encryption data of the provider; and obtaining a provider notification based on the comparison result of a match for displaying on a device.

It has been discovered that the information delivery system 100 obtaining the provider notification 204 of FIG. 2 based on the comparison result 266 of FIG. 2 improves the safety and efficiency of operating the first device 102 and the information delivery system 100. By obtaining the provider notification 204 when there is the match 272 of FIG. 2 between the client encryption data 248 of FIG. 2 and the provider encryption data 258 of FIG. 2, the anonymous client 202 of FIG. 2 can obtain the provider notification 204 when relevant to the anonymous client 202. As a result, the anonymous client 202 is not burdened by a push notification, thus, enhancing the user experience of operating the first device 102 and the information delivery system 100 without compromising the disclosure of the client information 210 to the broker server 208, the provider 206, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An information delivery system comprising:
   a control unit configured to:
      generate an anonymous identity for concealing client information of an anonymous client from a provider, the anonymous identity of the anonymous client different from a provider identity of the provider,
      generate a comparison result for determining whether a client encryption data of the anonymous identity encrypted with a client key matches with a provider encryption data of the provider encrypted with a provider key independent from the client key, and
      obtain a provider notification based on the comparison result of a match for displaying on a device, and
   a user interface, coupled to the control unit, configured to display the provider notification.

2. The system as claimed in claim 1 wherein the control unit is configured to obtain the provider notification based on decrypting an encrypted notification with the match between a provider testable representation and a client testable representation for displaying on the device.

3. The system as claimed in claim 1 wherein the control unit is configured to generate a fetch request with the anonymous identity based on the comparison result of the match for requesting the provider notification from the provider for displaying on the device.

4. The system as claimed in claim 1 wherein the control unit is configured to generate a client location abstraction based on assigning a location identifier for distinguishing a containing area from a non-containing area.

5. The system as claimed in claim 1 wherein the control unit is configured to generate a client interest abstraction based on abstracting a client selection from a preference hierarchy.

6. The system as claimed in claim 1 wherein the control unit is configured to generate a preference hierarchy based on organizing a category representation, a subcategory representation, or a combination thereof according to a categorization scheme.

7. The system as claimed in claim 1 wherein the control unit is configured to generate the comparison result based on comparing a client interest abstraction and a provider promotion abstraction in accordance with a preference hierarchy.

8. The system as claimed in claim 1 wherein the control unit is configured to generate a fetch request based on the comparison result of the match for requesting the provider notification from a broker server.

9. The system as claimed in claim 1 wherein the control unit is configured to generate the comparison result based on comparing a client testable representation and a provider testable representation.

10. The system as claimed in claim 1 wherein the control unit is configured to:
    generate a client location area based on establishing a geographic boundary surrounding a client location indicator;
    generate client location information based on the client location area; and
    generate a client location abstraction based on abstracting the client location information.

11. The system as claimed in claim 1 wherein the control unit is configured to:
    generate a client location indicator based on identifying latitude-longitude information;
    generate client location information based on the client location indicator; and
    generate a client location abstraction based on abstracting the client location information.

12. The system as claimed in claim 1 wherein the control unit is configured to:
    generate a provider second encryption data based on encrypting a provider first encryption data with the client key; and
    generate the comparison result based on comparing the provider second encryption data and a client second encryption data.

13. An information delivery system comprising:
    a control unit configured to:
       provide a provider testable representation for revealing a provider identity, generate a provider encryption data based on encrypting the provider testable representation with a provider key; and
    a communication unit, coupled to the control unit, configured to send a provider identity based on a comparison proceeding for comparing the provider encryption data to a client encryption data of an anonymous identity encrypted with a client key independent from the provider key, the anonymous identity different from the provider identity.

14. The system as claimed in claim 13 wherein:
    the communication unit is configured to receive a client first encryption data; and
    the control unit is configured to generate a client second encryption data based on encrypting the client first encryption data with the provider key for sending to the device.

15. The system as claimed in claim 13 wherein:
    the communication unit is configured to receive a fetch request based on the provider identity for requesting a provider notification from a provider; and
    the control unit is configured to calculate a customer lead for counting the fetch request received by the provider.

16. The system as claimed in claim 13 wherein the control unit is configured to provide the provider key for generating a client second encryption data.

17. The system as claimed in claim 13 wherein the communication unit is configured to receive a fetch request with the anonymous identity for concealing client information from the provider.

18. A method of operation of an information delivery system comprising:
    generating an anonymous identity with a control unit for concealing client information of an anonymous client from a provider, the anonymous identity of the anonymous client different from a provider identity of the provider;
    generating a comparison result for determining whether a client encryption data of the anonymous identity encrypted with a client key matches with a provider encryption data of the provider encrypted with a provider key independent from the client key; and obtaining a provider notification based on the comparison result of a match for displaying on a device.

19. The method as claimed in claim 18 wherein obtaining the provider notification includes obtaining the provider notification based on decrypting an encrypted notification with the match between a provider testable representation and a client testable representation for displaying on the device.

20. The method as claimed in claim 18 wherein obtaining the provider notification includes generating a fetch request with the anonymous identity based on the comparison result of the match for requesting the provider notification from the provider for displaying on the device.

21. The method as claimed in claim 18 further comprising generating a client location abstraction based on assigning a location identifier for distinguishing a containing area from a non-containing area.

22. The method as claimed in claim 18 further comprising generating a client interest abstraction based on abstracting a client selection from a preference hierarchy.

23. The method as claimed in claim 18 further comprising generating a preference hierarchy based on organizing a category representation, a subcategory representation, or a combination thereof according to a categorization scheme.

24. The method as claimed in claim 18 wherein generating the comparison result includes generating the comparison result based on comparing a client interest abstraction and a provider promotion abstraction in accordance with a preference hierarchy.

25. A non-transitory computer readable medium comprising:

generating an anonymous identity for concealing client information of an anonymous client from a provider, the anonymous identity of the anonymous client different from a provider identity of the provider;

generating a comparison result for determining whether a client encryption data of the anonymous identity encrypted with a client key matches with a provider encryption data of the provider encrypted with a provider key independent from the client key; and obtaining a provider notification based on the comparison result of a match for displaying on a device.

26. The non-transitory computer readable medium as claimed in claim 25 wherein obtaining the provider notification includes obtaining the provider notification based on decrypting an encrypted notification with the match between a provider testable representation and a client testable representation for displaying on the device.

27. The non-transitory computer readable medium as claimed in claim 25 wherein obtaining the provider notification includes generating a fetch request with the anonymous identity based on the comparison result of the match for requesting the provider notification from the provider for displaying on the device.

28. The non-transitory computer readable medium as claimed in claim 25 wherein generating the comparison result includes generating the comparison result based on comparing a client testable representation and a provider testable representation.

29. The non-transitory computer readable medium as claimed in claim 25 further comprising:

generating a client location area based on establishing a geographic boundary surrounding a client location indicator;

generating client location information based on the client location area; and generating a client location abstraction based on abstracting the client location information.

30. The non-transitory computer readable medium as claimed in claim 25 further comprising:

generating a client location indicator based on identifying latitude-longitude information;

generating client location information based on the client location indicator; and generating a client location abstraction based on abstracting the client location information.

31. The non-transitory computer readable medium as claimed in claim 25 further comprising:

generating a provider second encryption data based on encrypting a provider first encryption data with the client key; and wherein:

generating the comparison result includes generating the comparison result based on comparing the provider second encryption data and a client second encryption data.

* * * * *